(12) United States Patent
Sato et al.

(10) Patent No.: US 6,681,388 B1
(45) Date of Patent: Jan. 20, 2004

(54) METHOD AND COMPILER FOR REARRANGING ARRAY DATA INTO SUB-ARRAYS OF CONSECUTIVELY-ADDRESSED ELEMENTS FOR DISTRIBUTION PROCESSING

(75) Inventors: Makoto Sato, Sagamihara (JP); Takashi Hirooka, Sagamihara (JP)

(73) Assignees: Real World Computing Partnership, Tokyo (JP); Hitachi, Ltd., Tokyo (JP)

(*) Notice: Subject to any disclaimer, the term of this patent is extended or adjusted under 35 U.S.C. 154(b) by 0 days.

(21) Appl. No.: 09/409,900

(22) Filed: Oct. 1, 1999

(30) Foreign Application Priority Data

Oct. 2, 1998 (JP) ............................................ 10-281692

(51) Int. Cl.[7] ................................................. G06F 9/45

(52) U.S. Cl. ...................................... 717/159; 717/149

(58) Field of Search ................................ 717/149, 119, 717/150, 151, 153–5, 159–61, 146

(56) References Cited

U.S. PATENT DOCUMENTS

| | | | | |
|---|---|---|---|---|
| 5,247,632 A | * | 9/1993 | Newman ........................ | 711/1 |
| 5,475,842 A | * | 12/1995 | Gilbert et al. ............... | 717/160 |
| 5,485,619 A | * | 1/1996 | Lai et al. ...................... | 717/150 |
| 5,659,714 A | * | 8/1997 | Yoshida ....................... | 711/202 |
| 5,845,126 A | * | 12/1998 | Ju et al. ....................... | 717/149 |

OTHER PUBLICATIONS

Kandemir, M., et al., "Improving Locality Using Loop and Data Transformations in an Integrated Framework," 1998, Proceedings of the 31st Annual ACM/IEEE International Symposium on Microarchitecture, MICRO–31, pp. 285–296.*

Sato, Makoto, et al., "Program Partitioning Optimizations in an HPF Prototype Compiler," 1996, COMPSAC '96, Proceedings of the 20th International Computer Software and Applications Conference, pp. 124–131.*

Tien–Pao Shih et al., "Grouping Array Layouts to Reduce Communication and Improve Locality of Parallel Programs," 1994, International Conference on Parallel and Distributed Systems, pp. 558–566.*

Haleh Najafzadeh and Lenore Mullin, "A General Partitioning Algorithm for Local/Global Array Addressing," Apr. 4, 1998, MASPLAS '98, 1998 Mid–Atlantic Student Workshop on Programming Languages and Systems, Rutgers The State University, NJ, pp. 1–14.*

Rajeev Thakur et al., "Efficient Algorithms for Array Redistribution," Jun. 1996, IEEE Transactions on Parallel and Distributed Systems, vol. 7, Issue 6, pp. 587–594.*

Rajeev Thakur et al., Runtime Array Redistribution in HPF Programs, May 1994, Proceedings of the Scalable High–Performance Computing Conference, pp. 309–316.*

(List continued on next page.)

*Primary Examiner*—Tuan Q. Dam
*Assistant Examiner*—Eric B. Kiss
(74) *Attorney, Agent, or Firm*—Mattingly, Stanger & Malur, P.C.

(57) ABSTRACT

In a data rearranging method for performing a distribution processing of an array in a multi processor system including a plurality of processors each of which has an independent memory, there are included the following steps of collecting data distribution formats that indicate schemes of allocating the respective array elements to the distributed-memories at the respective points in a program, and subdividing the array into a set of subarrays, each of the subarrays belonging to only one processor in any one of the data distribution formats obtained at the above-described format collecting step, and increasing the number of dimensions of the original array and rearranging sequence of array elements so that the array elements within each of the above-described subarrays possess consecutive addresses.

2 Claims, 33 Drawing Sheets

OTHER PUBLICATIONS

Palermo, Daniel J. et al, "Dynamic Data Partitioning for Distributed–Memory Multicomputers", Journal of Parallel and Distributed Computing, vol. 38, Academic Press, 1996, pp. 158–175.

Tseng, Chau–Wen, "Compiler Optimizations for Eliminating Barrier Synchronization", ACM SIG Plan Notices, vol. 30, No. 8, Aug. 1995, pp. 144–154.

Anderson, Jennifer M. et al, "Data and Computation Transformations for Multiprocessors", ACM SIG Plan Notices, vol. 30, No. 8, Aug. 1995, pp. 166–178.

"High Performance Fortran Language Specification", High Performance Fortran Forum, Rice Univ., Houston TX, May 1996, pp. 4–22.

"MPI: A Message–Passing Interface Standard", Message Passing Interface Forum, Univ. of Tenn, May 1994, pp. 1–5.

Hiranandani, Seema et al, "Compiling Fortran D for MIMD Distributed–Memory Machines", Communications of the ACM, Aug. 1992, pp. 66–80.

Zima, Hans et al, "Supercompilers for Parallel and Vector Computers", ACM Press, 1991, pp. 7–11.

* cited by examiner

SOURCE PROGRAM 110

```
800:           real a( 12 , 12 ),b,c
801:    !HPF$  PROCESSORS proc( 4 )
802:    !HPF$  DISTRIBUTE a( block , * ) ONTO proc
803:           do k = 1,10
804:    !HPF$  REDISTRIBUTE a( block , * ) ONTO proc
805:             do j = 2,12
806:               do i = 1,12
807:                 a( i , j )=a( i , j )+a( i , j-1 ) * b
808:               enddo
809:             enddo
810:    !HPF$  REDISTRIBUTE a( * , block ) ONTO proc
811:             do j = 1,12
812:               do i = 2,12
813:                 a( i , j ) = a( i , j )+a( i -1, j ) * c
814:               enddo
815:             enddo
816:             call update( b , c )
817:           enddo
```

ARRAY REFERENCE TABLE

LOOP DISTRIBUTION RANGE TABLE (LDT)

LOOP TABLE AFTER LOOP RANGE SUBDIVISION OF LOOP i

LOOP TABLE AFTER LOOP RANGE SUBDIVISION OF LOOP j

FIG.18

PROGRAM AFTER LOOP PEELING

```
1800:   do k = 1,10
1810:     do j2 = 1,1
1811:     do j1 = 2,3
1812:     do i2 = 1,4
1813:     do i1 = 1,3
1814:       a( i , j ) = a( i , j ) + a( i , j - 1 ) * b
1815:     enddo;enddo;enddo;enddo
1820:     do j2 = 2,4
1821:     do j1 = 1,1
1822:     do i2 = 1,4
1823:     do i1 = 1,3
1824:       a( i , j ) = a( i , j ) + a( i , j - 1 ) * b
1825:     enddo;enddo;enddo;enddo
1830:     do j2 = 2,4
1831:     do j1 = 2,3
1832:     do i2 = 1,4
1833:     do i1 = 1,3
1834:       a( i , j ) = a( i , j ) + a( i , j - 1 ) * b
1835:     enddo;enddo;enddo;enddo 1840:     do j2 = 1,4
1841:     do j1 = 1,3
1850:     do i2 = 1,1
1851:     do i1 = 2,3
1852:       a( i , j ) = a( i , j ) + a( i -1, j ) * c
1853:     enddo;enddo
1860:     do i2 = 2,4
1861:     do i1 = 1,1
1862:       a( i , j ) = a( i , j ) + a( i -1, j ) * c
1863:     enddo;enddo
1870:     do i2 = 2,4
1871:     do i1 = 2,3
1872:       a( i , j ) = a( i , j ) + a( i -1, j ) * c
1873:     enddo;enddo
1880:     enddo;enddo
1881:     call update(b , c)
1882:   enddo
```

FIG.19

PROGRAM AFTER SUBSCRIPT MODIFICATION

```
1900: real a( 3 , 3 , 4 , 4 )
1901: do k = 1,10
1910:   do j2 = 1,1
1911:   do j1 = 2,3
1912:   do i2 = 1,4
1913:   do i1 = 1,3
1914:     a( i1 , j1 , i2 , j2 ) = a(i1 , j1 , i2 , j2 ) + &
1915:       a( i1 , j1-1 , i2 , j2 ) * b
1916:   enddo;enddo;enddo;enddo
1920:   do j2 = 2,4
1921:   do j1 = 1,1
1922:   do i2 = 1,4
1923:   do i1 = 1,3
1924:     a( i1 , j1 , i2 , j2 ) = a(i1 , j1 , i2 , j2 ) + &
1925:       a( i1 , j1+2 , i2 , j2-1 ) * b
1926:   enddo;enddo;enddo;enddo
1930:   do j2 = 2,4
1931:   do j1 = 2,3
1932:   do i2 = 1,4
1933:   do i1 = 1,3
1934:     a( i1 , j1 , i2 , j2 ) = a(i1 , j1 , i2 , j2 ) + &
1935:       a( i1 , j1-1 , i2 , j2 ) * b
1936:   enddo;enddo;enddo;enddo 1940:   do j2 = 1,4
1941:   do j1 = 1,3
1950:   do i2 = 1,1
1951:   do i1 = 2,3
1952:     a( i1 , j1 , i2 , j2 ) = a(i1 , j1 , i2 , j2 ) + &
1953:       a( i1-1 , j1 ,i2 , j2 ) * c
1954:   enddo;enddo
1960:   do i2 = 2,4
1961:   do i1 = 1,1
1962:     a( i1 , j1 , i2 , j2 ) = a(i1 , j1 , i2 , j2 ) + &
1963:       a( i1+2 , j1 , i2-1 , j2 ) * c
1964:   enddo;enddo
1970:   do i2 = 2,4
1971:   do i1 = 2,3
1972:     a( i1 , j1 , i2 , j2 ) = a(i1 , j1 , i2 , j2 ) + &
1973:       a( i1-1 , j1 , i2 , j2 ) * c
1974:   enddo;enddo
1980:   enddo;enddo
1981:   call update( b , c )
1982: enddo
```

DATA DISTRIBUTION INFORMATION AFTER BEING MODIFIED

FIG.21

PROGRAM AFTER BEING PARALLELIZED

```
2100:   real a( 3 , 3 , 4 , 4 ) , b , c
2101:   do k = 1,10
2102:     call non_buf_remap( a , D1 , D2 )
2110:     do j2 = 1,1
2111:       do j1 = 2,3
2112:         do i1 = 1,3
2113:           a( i1 , j1 , mype , j2 ) = a( i1 , j1 , mype , j2 ) + &
2114:             a( i1 , j1-1 , mype , j2 ) * b
2115:     enddo;enddo;enddo
2120:     do j2 = 2,4
2121:       do j1 = 1,1
2122:         do i1 = 1,3
2123:           a( i1 , j1 , mype , j2 ) = a( i1 , j1 , mype , j2 ) + &
2124:             a( i1 , j1+2 , mype , j2-1 ) * b
2125:     enddo;enddo;enddo
2130:     do j2 = 2,4
2131:       do j1 = 2,3
2132:         do i1 = 1,3
2133:           a( i1 , j1 , mype , j2 ) = a( i1 , j1 , mype , j2 ) + &
2134:             a( i1 , j1-1 , mype , j2 ) * b
2135:     enddo;enddo;enddo
2140:     call non_buf_remap( a , D2 , D1 )
2141:     do j1 = 1,3
2150:       do i2 = 1,1
2151:         do i1 = 2,3
2152:           a( i1 , j1 , i2 , mype ) = a( i1 , j1 , i2 , mype ) + &
2153:             a( i1-1 , j1 , i2 , mype ) * c
2154:     enddo;enddo
2160:       do i2 = 2,4
2161:         do i1 = 1,1
2162:           a( i1 , j1 , i2 , mype ) = a( i1 , j1 , i2 , mype ) + &
2163:             a( i1+2 , j1 , i2-1 , mype ) * c
2164:     enddo;enddo
2170:       do i2 = 2,4
2171:         do i1 = 2,3
2172:           a( i1 , j1 , i2 , mype ) = a( i1 , j1 , i2 , mype ) + &
2173:             a( i1-1 , j1 , i2 , mype ) * c
2174:     enddo;enddo
2180:     enddo
2181:     call update( b , c )
2182:   enddo
```

FIG.22
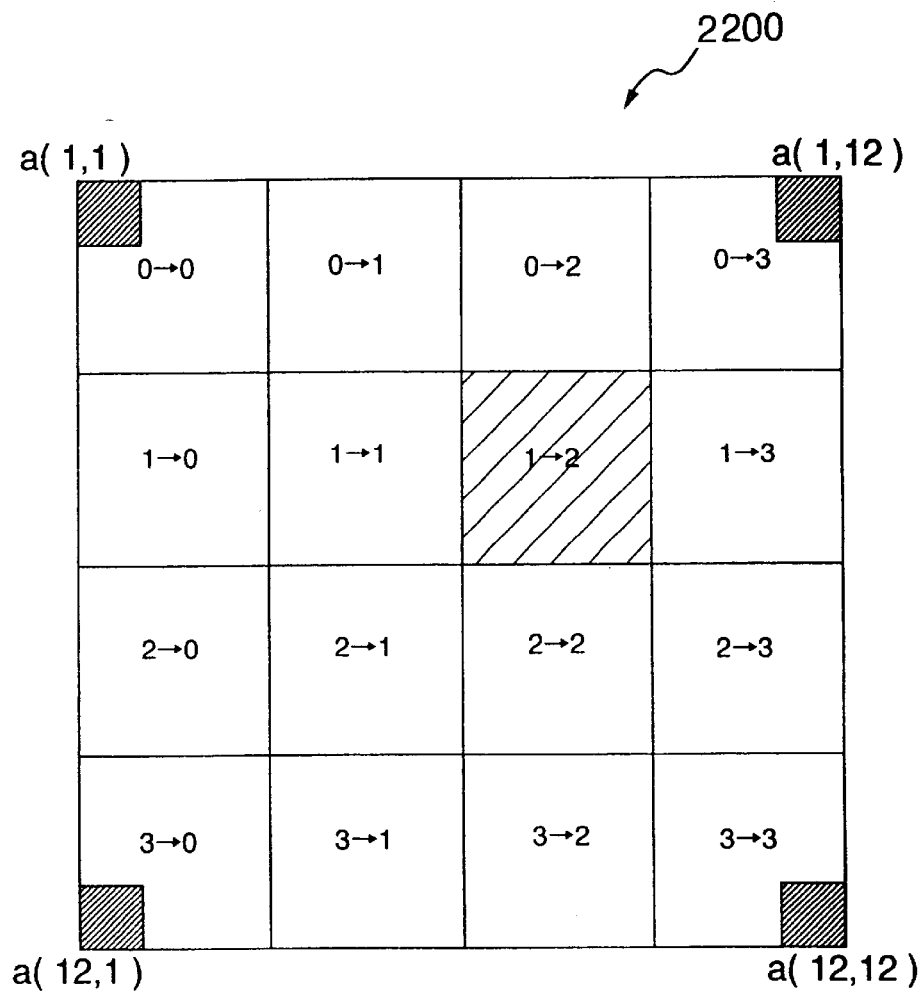
PROCESSOR NUMBER
BEFORE DATA
REDISTRIBUTION  PROCESSOR NUMBER
AFTER DATA
REDISTRIBUTION

FIG.23
PRIOR ART

PARALLELIZED PROGRAM

```
2300:  real a( 3 , 12 ) , b , c
2301:  do k = 1,10
2302:     call remap( a , E1 , E2 )
2310:     do j = 2,12
2311:     do i = 1,3
2313:        a( i , j ) = a( i , j ) + a( i , j-1 ) * b
2314:     enddo;enddo
2320:     call remap( a , E2 , E1 )
2330:     do j = 1,3
2331:     do i = 2,12
2332:        a( i , j ) = a( i , j ) + a( i-1 , j ) * c
2333:     enddo;enddo
2340:     call update( b , c )
2341:  enddo
```

FIG.28

SOURCE PROGRAM 2710

```
2800:   real a( 12 , 12 ) , b , c
2801:   do k = 1,10
2802:      do j = 2,12
2803:         do i = 1,12
2804:            a( i , j ) = a( i , j ) + a( i , j-1 ) * b
2805:         enddo
2806:      enddo
2807:      do j = 1,12
2808:         do i = 2,12
2809:            a( i , j ) = a( i , j ) + a( i-1 , j ) * c
2810:         enddo
2811:      enddo
2812:      call update( b , c )
2813:   enddo
```

FIG.29

PROGRAM AFTER BEING PARALLELIZED 2720

```
2900:   real a( 3 , 3 , 4 , 4 ) , b , c
2901:   call fork
2902:   do k = 1,10
2903:     call barrier
2910:     do j2 = 1,1
2911:       do j1 = 2,3
2912:         do i1 = 1,3
2913:           a( i1 , j1 , mype , j2 ) = a( i1 , j1 , mype , j2 ) + &
2914:             a( i1 , j1-1 , mype , j2 ) * b
2915:     enddo;enddo;enddo
2920:     do j2 = 2,4
2921:       do j1 = 1,1
2922:         do i1 = 1,3
2923:           a( i1 , j1 , mype , j2 ) = a( i1 , j1 , mype , j2 ) + &
2924:             a( i1 , j1+2 , mype , j2-1 ) * b
2925:     enddo;enddo;enddo
2930:     do j2 = 2,4
2931:       do j1 = 2,3
2932:         do i1 = 1,3
2933:           a( i1 , j1 , mype , j2 ) = a( i1 , j1 , mype , j2 ) + &
2934:             a( i1 , j1-1 , mype , j2 ) * b
2935:     enddo;enddo;enddo
2940:     call barrier
2941:     do j1 = 1,3
2950:       do i2 = 1,1
2951:         do i1 = 2,3
2952:           a( i1 , j1 , i2 , mype ) = a( i1 , j1 , i2 , mype ) + &
2953:             a( i1-1 , j1 , i2 , mype ) * c
2954:     enddo;enddo
2960:       do i2 = 2,4
2961:         do i1 = 1,1
2962:           a( i1 , j1 , i2 , mype ) = a( i1 , j1 , i2 , mype ) + &
2963:             a( i1+2 , j1 , i2-1 , mype ) * c
2964:     enddo;enddo
2970:       do i2 = 2,4
2971:         do i1 = 2,3
2972:           a( i1 , j1 , i2 , mype ) = a( i1 , j1 , i2 , mype ) + &
2973:             a( i1-1 , j1 , i2 , mype ) * c
2974:     enddo;enddo
2980:     enddo
2981:     call update( b , c )
2982:   enddo
2983:   call join
```

FIG.30
PRIOR ART

PARALLELIZED PROGRAM

```
3000:   real a( 12 , 12 ) , b , c
3001:   call fork
3002:   do k = 1,10
3003:     call barrier
3010:     do j = 2,12
3011:       do i = 3 * mype +1,3 * ( mype +1 )
3012:         a( i , j ) = a( i , j ) + a( i , j-1 ) * b
3013:     enddo;enddo
3020:     call barrier
3030:     do j= 3 * mype +1,3 * ( mype +1 )
3031:       do i = 2,12
3032:         a( i , j ) = a( i , j ) + a( i-1 , j ) * c
3033:     enddo;enddo
3040:     call update( b , c )
3041:   enddo
3042:   call join
```

FIG.31
PRIOR ART
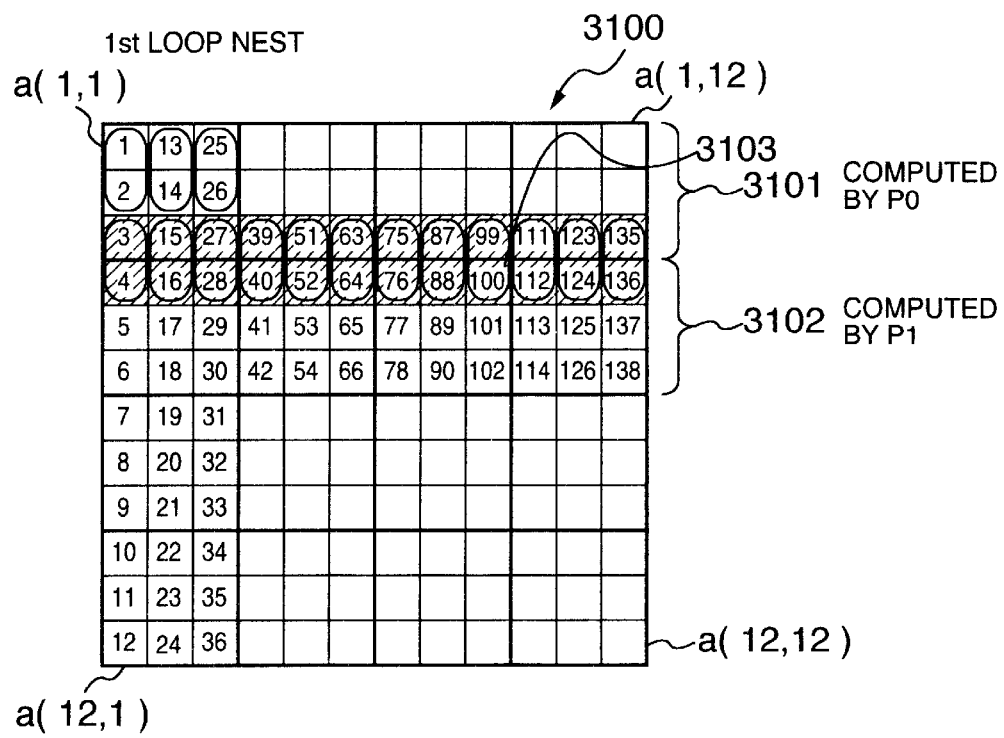
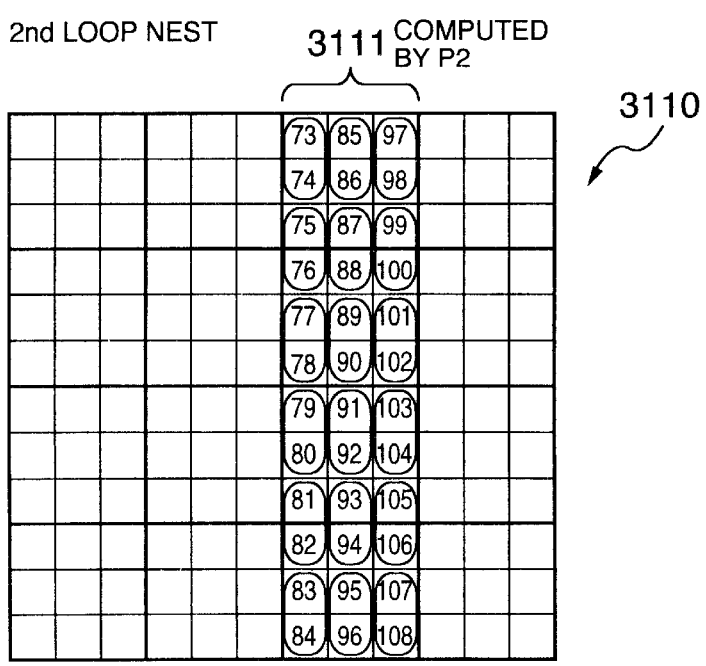

FIG.32
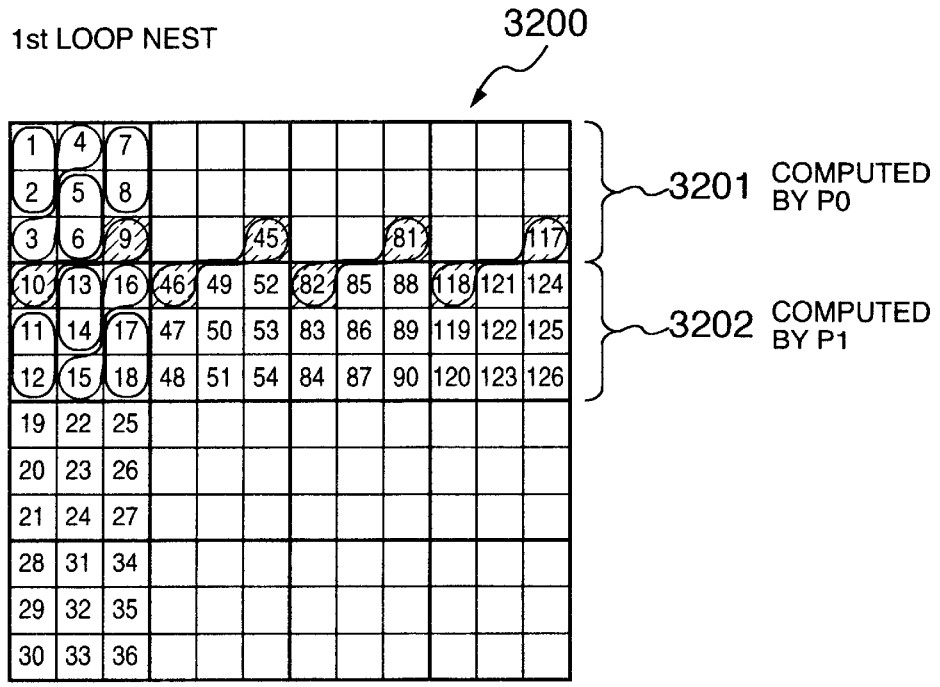
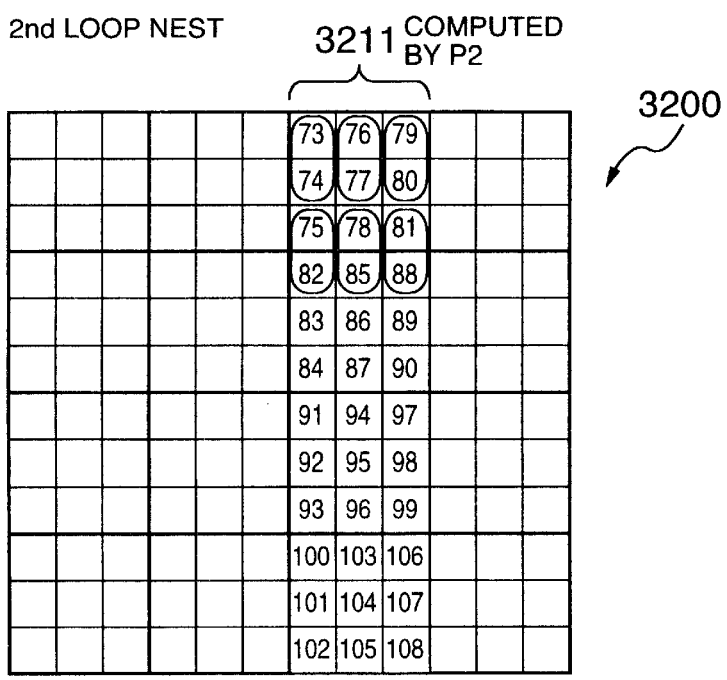

METHOD AND COMPILER FOR REARRANGING ARRAY DATA INTO SUB-ARRAYS OF CONSECUTIVELY-ADDRESSED ELEMENTS FOR DISTRIBUTION PROCESSING

BACKGROUND OF THE INVENTION

The present invention relates to a distribution processing for a multi processor system, and more particularly to a method of rearranging data for the distribution processing and a compiler that performs the data rearrangement.

As a technique for speeding up data redistribution in a distributed-memory type multi processor system, as mentioned on pp. 170–171 in Daniel J. Palermo, Eugene W. Hodges IV, and Prithviraj Banerjee. "Dynamic Data Partitioning for Distributed-Memory Muticomputers", Journal of Parallel and Distributed Computing 38, pp. 158–175 (1996), there has existed a technique of allowing a starting-up overhead in the data redistribution to be reduced by aggregation of the data redistribution operation. Here, the aggregation means the following: A plurality of arrays that are to undergo the data redistribution or a non-consecutive portion in one array that is to undergo the data redistribution are copied to a consecutive address region in one buffer at the time of executing the program, thereby performing the data redistribution toward the buffer only a single time.

Also, as a technique for reducing an inter-cache conflict that is referred to as "false sharing" in a shared-memory type multi processor system, as described in Jennifer M. Anderson, Saman P. Amarasinghe, and Monica S. Lam. "Data and Communication Transformations for Multi processors", PPOPP' 95, pp. 166–178 (1995), there has existed the following technique: Of dimensions of an array, a dimension used for specifying array elements the addresses of which are consecutive is partitioned into dimensions the number of which is equal to that of the processors, thus partitioning the dimension into two dimensions, i.e., a dimension including only the subscripts that a single processor accesses and a dimension designating the processor number. Moreover, the array in the latter dimension is expanded so that the latter dimension becomes a dimension where an increase in the addresses is the most gradual one, thereby reducing an opportunity that data in the caches spreads across two processors.

In the first conventional technique described above, since the data is copied to the buffer at the time of executing the program, there exists a problem that it takes an extra time to make the copy.

Also, in the first conventional technique described above, there is a possibility that sizes of the arrays are varied before and after the data redistribution. Accordingly, it is required to ensure and open the array region every time the data redistribution is performed, and thus there exists a problem that it takes an extra time therefor.

Further, in the first conventional technique, the array format changes by the array region allotment and release and before and after the redistribution. It requires the copy of subarray which assigned to the same processor before and after the redistribution, which copy is not necessary in normal process, and it also requires extra time.

In the second prior art, in case that a program has two different loops and respective loop access the array differently, the data conversion is made to reduce the false sharing only for one loop. It is still a problem that the false sharing may highly occur for the other loop.

SUMMARY OF THE INVENTION

It is an object of the present invention to eliminate a processing of copying data to a buffer and thus to shorten an execution time of a program, the data being sent and received among the processors when a distribution processing is executed in a multi processor system having distributed-memories.

Also, it is another object of the present invention to eliminate a processing of ensuring and opening an array region at the time of redistributing data to each of the processors, and thus to shorten the execution time of a program.

Also, it is still another object of the present invention to eliminate copy of a subarray allotted to one and the same processor before and after the data redistribution, and thereby to shorten the execution time of a program.

Also, it is a further object of the present invention to reduce the inter-cache conflict toward all the loops when a distribution processing is executed in a multi processor system having a shared-memory, and thereby to shorten the execution time of a program.

The present invention provides a data rearranging method for accomplishing the above-described objects.

In a data rearranging method for performing a distribution processing of an array in a multi processor system including a plurality of processors each of which has an independent memory, there are included the following steps of collecting data distribution formats that indicate schemes of allocating the respective array elements to the memories at the respective points in a program, and subdividing the array into sets that include subarrays, each of the subarrays belonging to only one processor in any one of the data distribution formats obtained at the above-described format collecting step, and increasing the number of dimensions of the original array and rearranging sequence of array elements so that the array elements within each of the above-described subarrays possess consecutive addresses.

Also, in a data rearranging method for performing a distribution processing of an array in a multi processor system including a plurality of processors that share a single memory, there are included the following steps of collecting data assignment formats that, for the array to be distribution-processed by the plurality of processors, indicate schemes of computation-assigning the respective array elements to the plurality of processors at the respective points in a program, and subdividing the array into a set of subarrays, each of the subarrays being assigned to only one processor in any one of the data assignment formats obtained at the above-described format collecting step, and increasing the number of dimensions of the original array and rearranging sequence of array elements so that the array elements within each of the above-described subarrays possess consecutive addresses.

BRIEF DESCRIPTION OF THE DRAWINGS

FIG. 18 shows an example of an intermediate language after the loop peeling;

FIG. 19 shows an example of an intermediate language after modifying the subscripts;

FIG. 21 shows an example of a program after being parallelized;

FIG. 22 is a diagram for illustrating a manner of data redistribution;

FIG. 23 shows an example of a parallelized program based on the conventional technique;

FIG. 28 shows an example of a source program;

FIG. 29 shows an example of a program after being parallelized;

FIG. 30 shows an example of a parallelized program based on the conventional technique;

FIG. 31 is a diagram for explaining computation assignment portions to the processors based on the conventional parallelizing;

FIG. 32 is a diagram for explaining computation assignment portions to the processors based on the parallelizing in the second embodiment.

DESCRIPTION OF THE EMBODIMENTS

(1) First Embodiment

Figure 26:
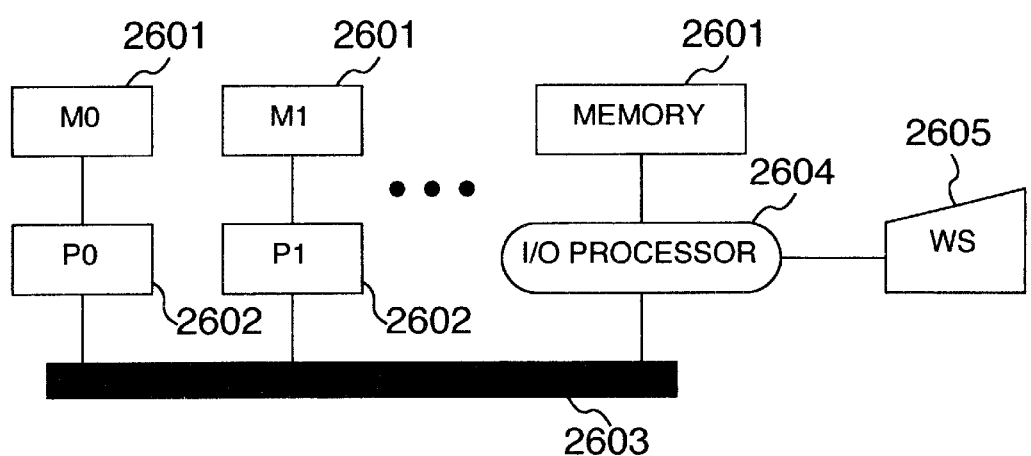
FIG. 26 shows a configuration example of a multi processor system that is an object of the compiler in the first embodiment.

FIG. 26 shows an example of a hardware configuration of a multi processor systems having distributed-memories. In the same figure, the reference numerals each denotes the following components: 2601 local memories, 2602 logical processor elements, 2603 a network, 2604 an input/output logical processor element, and 2605 an input/output console or workstation.

Although the number of the pairs of the local memories 2601 and the logical processor elements 2602 is arbitrary, in the present embodiment, it is assumed that the number of the pairs is equal to 4.

A parallelizing compiler 100 (shown in FIG. 1) according to the present embodiment is executed in the input/output console or workstation 2605, then being transformed to a parallel source program or a parallel object program. The parallel source program in the former is further transformed to the parallel object program by a compiler for the logical processor elements 2602. The parallel object program is transformed to load modules by linker, and the load modules are loaded into the respective local memories 2601 of the respective logical processor elements 2602 through the input/output logical processor element 2604, then being executed by the respective logical processor elements 2602. Moreover, communications among the respective load modules at the time of the execution are carried out through the network 2603.

The load modules (parallelized programs) loaded into all the local memories 2601 are identical to each other. Each of the logical processor elements 2602 identifies a unique processor ID assigned to themselves, thereby recognizing data to be processed.

Also, data exchange during the execution of the programs is performed by communications among the logical processor elements by way of the network 2603. Furthermore, the communications are carried out using MPI (Message Passing Interface) designed for a distributed-memory type machine.

The specification of MPI has been explained in detail in "MPI: A Message-Passing Interface Standard", Message Passing Interface Forum, University of Tennessee, Knoxville, Tenn., 1994.

As the processing dealt with so often in the multi processor system like this, there can be mentioned a large scale matrix computation or vector computation. Here, there is presented a source program 110 in FIG. 8, taking, for simplicity, the computation of a 12 by 12 matrix as an example.

The source program 110 is a program into which data distribution directives such as HPF (High Performance Fortran) are inserted. Here, the data distribution directive means a statement that instructs the compiler to partition data and to allocate the partitioned individual data to one of the plurality of logical processors.

The language specification of HPF has been explained in detail in "High Performance Fortran Language Specification Ver. 2.0.α.2", High Performance Fortran Forum, Center of Research on Parallel Computation, Rice Univ., Houston, Tex., 1996.

A statement 800 is a declaration of an array a and scalar variables b, c based on FORTRAN syntax rules. A portion surrounded by a statement 803 and a statement 817 is a loop body with k employed as a loop control variable.

A portion surrounded by a statement 805 and a statement 809 is a loop body with j employed as the loop control variable. A portion surrounded by a statement 806 and a statement 808 is a loop body with i employed as the loop control variable.

A portion surrounded by a statement 811 and a statement 815 is, similarly, a loop body with j employed as the loop control variable. A portion surrounded by a statement 812 and a statement 814 is, similarly, a loop body with i employed as the loop control variable. A statement 816 is a procedure calling-up statement that modifies values of the scalar variables b, c.

Statements 801, 802, 804 and 810 are the directives in HPF. A notation "!HPF$" is a keyword indicating that a statement starting therewith is a directive in HPF. The statement 801 is a directive specifying a arrangement format of the logical processors. A notation "PROCESSORS" is a keyword and, by a notation "proc (4)" subsequent thereto, declares that 4 units of the logical processors are located in a straight line-like manner.

The statement 802 is a statement instructing an initial partitioning of the array a. A notation "DISTRIBUTE" is a keyword and, by a notation "a (block, *) ONTO proc" subsequent thereto, indicates that the 1st dimension of the array a is partitioned by a method "block" and the respective subarrays resulting from the partitioning are allocated to the logical processors proc (1), proc (2), proc (3) and proc (4), respectively.

Here, in the above-described logical processor declaration, performing the block-partitioning of the 1st dimension of the array a means the following: Assuming that a lower limit value in the 1st dimension of the array a is equal to 1 and an upper limit value therein is equal to N, subscripts in the 1st dimension of the array a are sectioned from 1 by a group of subscripts the number of which is [(N−1)/4]+1, and the resultant groups thus sectioned are allocated to proc (1) first and then to the remaining logical processors in sequence. In this case, a (1:3, 1:12), a (4:6, 1:12), a (7:9, 1:12) and a (10:12, 1:12) are allocated to proc (1), proc (2), proc (3) and proc (4), respectively.

The statement 804 is a statement instructing a repartitioning of the array a during the execution of the programs. A notation "REDISTRIBUTE" is a keyword and, by a notation "a (block, *) ONTO proc" subsequent thereto, indicates that the 1st dimension of the array a is partitioned by the method of the block and the respective subarrays resulting from the partitioning are allocated to the logical processors proc (1), proc (2), proc (3) and proc (4), respectively. This directive modifies the method of allocating the array elements, which have been allocated to the logical processors in the other way until now, to the way in which the 1st dimension of the array a is block-partitioned. This generally causes data transfer to occur among the logical processors.

The statement 810 is, similarly, a statement instructing a repartitioning of the array a during the execution of the programs. Unlike the statement 804, however, this statement instructs the way of allocating the array elements in which the 2nd dimension of the array a is block-partitioned.

In this case, a (1:12, 1:3), a (1:12, 4:6), a (1:12, 7:9) and a (1:12, 10:12) are allocated to proc (1), proc (2), proc (3) and proc (4), respectively.

FIG. 22 is a diagram for explaining a manner of the data redistribution. A reference numeral 2200 represents the 2-dimensional array a in which the numbers of the array elements in the first and the 2nd dimensions are 12, respectively. The longitudinal direction represents the 1st dimension of the array a, and this dimension corresponds to a dimension in FORTRAN in which the addresses are consecutive. Also, the transverse direction represents the 2nd dimension of the array a.

Each of 16 units of rectangles in 2200 represents a 3 by 3 subarray. A numeral on the left side of an arrow in each subarray indicates a logical processor number to which each subarray is allocated when the array a is block-distributed to 4 units of the logical processors by a method of (block, *). A numeral on the right side of the arrow in each subarray indicates a logical processor number to which each subarray is allocated when the array a is block-distributed to 4 units of the logical processors by a method of (*, block). Accordingly, the arrow and the numerals on the left and the right sides thereof in each subarray indicates that, by the data redistribution from (block, *) to (*, block), each subarray is sent from the logical processor with the number on the left to the logical processor with the number on the right.

FIG. 23 shows a parallelized program based on the conventional technique. As indicated by a declaration of the array a in a statement 2300, the 1st dimension of the array a is partitioned and thus the size has become equal to 3.

Figure 8:
FIG. 8 shows an example of a source program.

A redistribution routine "remap" in a statement 2302, which corresponds to the redistribution directive in the statement 804 in FIG. 8, is a routine that performs the data redistribution of the array a from a data distribution format described in a descriptor E1 to a data distribution format described in a descriptor E2.

Also, a redistribution routine "remap" in a statement 2320, which corresponds to the redistribution directive in the statement 810 in FIG. 8, is a routine that performs the data redistribution of the array a from the data distribution format described in the descriptor E2 to the data distribution format described in the descriptor E1.

Figure 24:
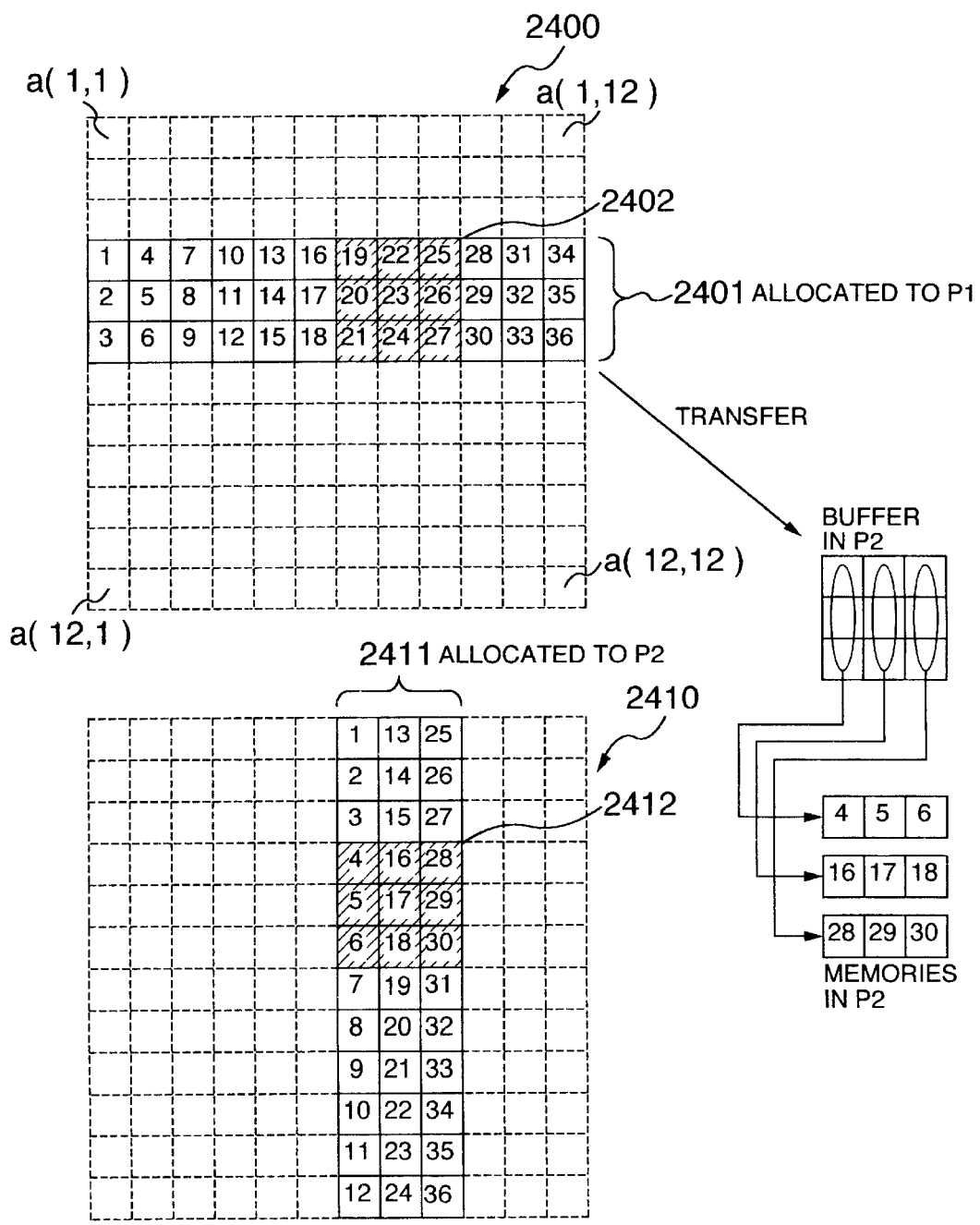
FIG. 24 is a diagram for explaining the data redistribution resulting from the conventional parallelizing.

FIG. 24 is a diagram that illustrates a manner of the data redistribution resulting from the conventional parallelizing, paying a special attention to data sent from a logical processor 1 (P1) to a logical processor 2 (P2).

A subarray with 3 rows and 12 columns denoted by a reference numeral 2401 is the partitioned data that is allocated to P1 when the array a is partitioned by the data distributing method of (block, *) and parallelized.

A reference numeral 2400 denotes the original array a with 12 rows and 12 columns, which is presented for information so as to indicate a relative position of the partitioned data 2401 in the original array a. Since the array a is data-distributed by the method of (block, *), the 1st dimension of the array a is partitioned into four portions. The partitioned data 2401, which is one of the four portions, becomes the data allocated to P1. Numerals in the data 2401 indicate sequence of addresses of array elements in the data 2401 allocated to P1.

A subarray with 12 rows and 3 columns denoted by a reference numeral 2411 is the partitioned data that is allocated to P2 when the array a is partitioned by the data distributing method of (*, block) and parallelized.

A reference numeral 2410 denotes the original array a with 12 rows and 12 columns, which is presented for information so as to indicate a relative position of the partitioned data 2411 in the original array a. Since the array a is data-distributed by the method of (*, block), the 2nd dimension of the array a is partitioned into four portions. The partitioned data 2411, which is one of the four portions, becomes the data allocated to P2. Numerals in the data 2411 indicate sequence of addresses of array elements in the data 2411 allocated to P2.

A crosshatched portion 2402 in the partitioned data 2401 indicates data sent from P1 to P2 by the data redistribution from (block, *) to (*, block). Judging from the sequence of the addresses in the figure, the data is consecutive data including the 19th to 27th array elements.

Meanwhile, a crosshatched portion 2412 in the partitioned data 2411 indicates storage destination of data that P2 receives from P1 by the data redistribution from (block, *) to (*, block). Judging from the sequence of the addresses in the figure, the data is non-consecutive data including the 4th to 6th, 16th to 18th, and 28th to 30th array elements.

Consequently, the sending-side data has the consecutive addresses. On the receiving side, however, it is required to store the data in the non-consecutive addresses. Although, in some cases, some of data communication routines allow the sending-side data to have a plurality of non-consecutive addresses, the receiving-side data, usually, must have consecutive addresses. In the case where it is intended to send all the data by a single data transfer, buffering is of absolute necessity on the receiving side. Namely, a sending routine sends the sending-side data 2402 to buffers in P2 where the addresses are consecutive. Then, P2, which has received and stored the sending-side data in the buffers therein, copies the data to the portion 2412 once for each column, i.e., at least 3 times in total.

Figure 25:
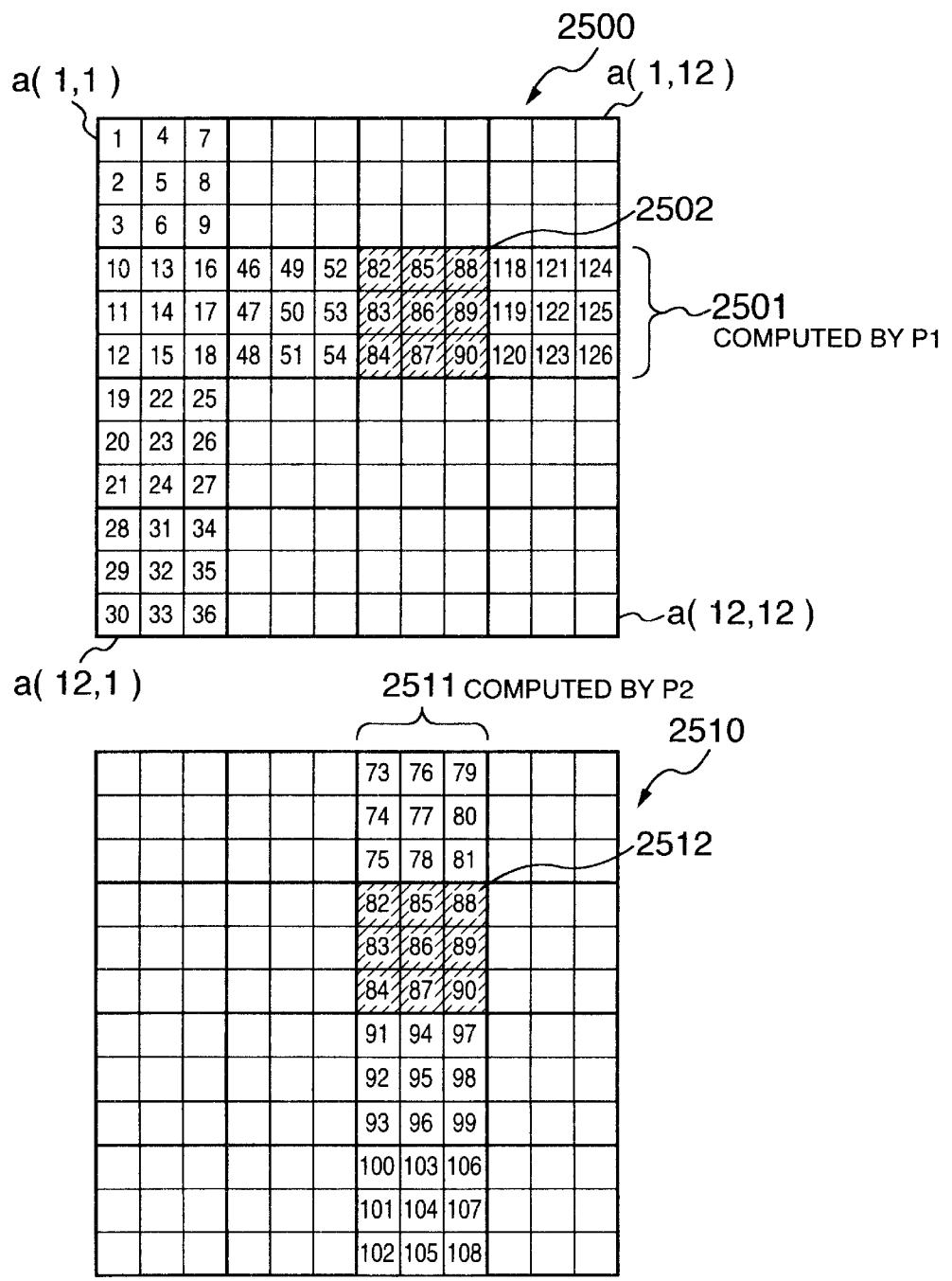
FIG. 25 is a diagram for explaining the data redistribution resulting from the parallelizing in the first embodiment.

FIG. 25 is a diagram that illustrates a manner of the data redistribution resulting from the parallelizing according to the present embodiment, paying attention to data sent from P1 to P2.

Numerals in 2500 indicate sequence of addresses of the array elements in a data array 2500 that is provided in the present embodiment. Sequence of addresses of the first 36 array elements is illustrated in a portion with 12 rows and 3 columns that starts from the upper-left corner of the data array 2500. Judging from the sequence of the addresses, the portions, each of which has 3 rows and 3 columns and is sectioned by heavy lines, have consecutive addresses. This situation is also the same concerning the other portions where no numeral has been indicated.

A 3 by 12 subarray denoted by a reference numeral 2501, which is covered by the numbers: 10 to 18, 46 to 54, 82 to 90 and 118 to 126, is data the array elements of which P1 takes charge of calculating when the array a is partitioned by the data distributing method of (block, *) and parallelized.

A 12 by 3 subarray denoted by a reference numeral 2511, which is 73rd to 108th in the sequence of the addresses, is data the array elements of which P2 takes charge of calculating when the array a is partitioned by the data distributing method of (*, block) and parallelized.

A shaded portion 2502 in the data 2501 indicates data sent from P1 to P2 by the data redistribution from (block, *) to (*, block). Judging from the sequence of the addresses illustrated in the figure, the data is consecutive data including the 82nd to 90th array elements.

Meanwhile, a shaded portion 2512 in the data 2511 indicates data that P2 receives from P1 by the data redistribution from (block, *) to (*, block). Judging from the sequence of the addresses illustrated in the figure, the data is also consecutive data including the 82nd to 90th array elements.

Consequently, it turns out that both the sending-side data and the receiving-side data have the consecutive addresses. Accordingly, there is no need of performing the data communication through the use of the buffers. This means that it is unnecessary to make the copy from the array to the buffers.

Next, there is explained a method of transforming the original array of a (12, 12) to the arrangement of the addresses that is illustrated in FIG. 25. Here, it is assumed that the array is a (N, N), and the number of the processors is P, and N is divisible by P. The arrangement after the transformation is expressed by a 4-dimensional array A.

$$a(i,j) \rightarrow A((i-1) \bmod L + 1, (j-1) \bmod L + 1, [(i-1)/L] + 1, [(j-1)/L] + 1) \quad (1)$$

Here, a (i, j), i.e., the left side of the arrow, represents an array element in the i-th row and j-th column of the array a, and the right side of the arrow represents a corresponding array element in the 4-dimensional array A after the transformation. Also, a notation L means N/P, and a symbol [ ] denotes a Gaussian symbol representing a rounding-down.

The first two dimensions within the 4-dimensional array A correspond to positions within the subarrays each of which has 3 rows and 3 columns and is sectioned by the heavy lines in the data array 2500. The remaining two dimensions indicate positions within a 4 by 4 array obtained by regarding each of the subarrays as one array element.

As an example, letting N=12, P=4 as is the case with FIG. 25 gives L=N/P=3. Then, the formula (1) becomes the following one:

$$a(i,j) \rightarrow A((i-1) \bmod 3 + 1, (j-1) \bmod 3 + 1, [(i-1)/3] + 1, [(j-1)/3] + 1) \quad (2)$$

Here, by the formula (2), an array element a (1, 1), which is situated at the upper-left corner of the data array 2500, is transferred to A (1, 1, 1, 1). This shows the followings: Array elements of the position array are (1, 1), i.e., the portion that has 3 rows and 3 columns and is sectioned by the heavy lines at the upper-left corner of the data array 2500. Moreover, array elements within a 2-dimensional array including the 3 by 3 portion are (1, 1). Eventually, the addresses that are the same as those of the original (1, 1) have been specified.

Also, a portion the address number of which is 83 in the data array 2500 is an array element a (5, 7). The array element a (5, 7) is transferred to A (2, 1, 2, 3) by the formula (2). This indicates the followings: Array elements of the position array are (2, 3), i.e., the portion 2502. Moreover, array elements within a 2-dimensional array including a 3 by 3 portion that the position array elements specify are (2, 1). Eventually, the portion the address number of which is 83 has been specified.

Figure 1:
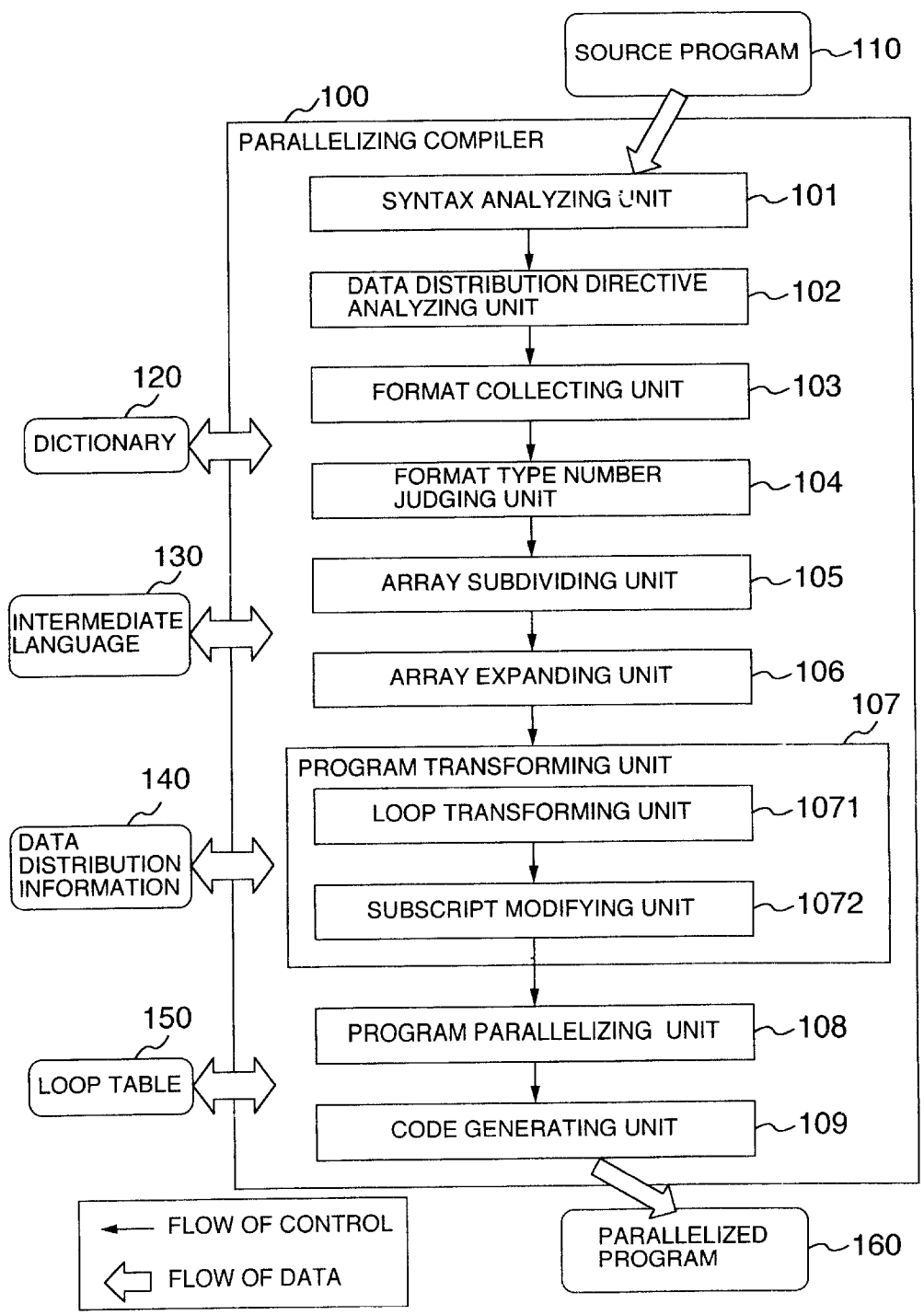
FIG. 1 is a configuration diagram of a parallelizing compiler according to the first embodiment of the present invention.

FIG. 1 illustrates the format of a parallelizing compiler performing the above-described transformation.

A reference numeral 100 denotes the parallelizing compiler. The parallelizing compiler 100, as is illustrated in the same figure, includes the following components: A syntax analyzing unit 101 for inputting a source program 110 and outputting a dictionary 120 and an intermediate language 130, a data distribution directive analyzing unit 102 for inputting the dictionary 120 and the intermediate language 130 so as to analyze a data distribution directive and outputting data distribution information 140, a format collecting unit 103 for inputting the data distribution information 140 so as to collect data distribution format information appearing within a program and causing the result to be reflected on the dictionary 120, a format type number judging unit 104 for inputting the dictionary 120 and the data distribution information 140 so as to judge the number of types of array data distribution and causing whether to subdivide the array or not to be reflected on the dictionary 120, an array subdividing unit 105 for inputting the dictionary 120 and the data distribution information 140 so as to subdivide the array and causing the result to be reflected on the dictionary 120, an array expanding unit 106 for inputting the dictionary 120 and the data distribution information 140 and partitioning an array subscript range of a dimension in which the data distribution format is varied and partitioning the dimension into two dimensions thereby to expand the array and causing the result to be reflected on the dictionary 120, a program transforming unit 107 for inputting the dictionary 120, the data distribution information 140 and the intermediate language 130 so as to transform the program and causing the result to be reflected on the intermediate language 130 and outputting a loop table 150, a program parallelizing unit 108 for inputting the dictionary 120, the data distribution information 140, the intermediate language 130 and the loop table 150 so as to parallelize the program and causing the result to be reflected on the dictionary 120, the intermediate language 130 and the loop table 150, and a code generating unit 109 for inputting the dictionary 120, the intermediate language 130 and the loop table 150 and outputting a parallelized program 160.

Here, the program transforming unit 107 includes a loop transforming unit 1071 and a subscript modifying unit 1072. By the way, partitioning the array subscript range at the time of expanding the array results in a phenomenon that the subscripts differ between a reference to an array element spreading across the partition boundary and a reference to an array element not spreading across the partition boundary. The loop transforming unit 1071 inputs the dictionary 120, the data distribution information 140 and the intermediate language 130, and, in order to deal with the above-described phenomenon, performs a loop peeling, a loop multiplexing, and, creating the loop table 150, causes the result to be reflected thereon and on the intermediate language 130. Here, the loop peeling distinguishes the loop iteration including a statement referring to the array element spreading across the partition boundary from the loop iteration not including such a statement and transforms them into different loops, and the loop multiplexing creates a loop for the subscripts that have increased in association with the array expanding. Furthermore, the subscript modifying unit 1072 modifies the array subscripts in association with the array expanding and the loop peeling.

Hereinafter, the explanation will be given concerning the individual processings in the parallelizing compiler 100.

The syntax analyzing unit 101 inputs the above-mentioned source program 110 and generates the dictionary 120 and the intermediate language 130. The intermediate language 130 may be a representation analogous to the source program, or a tree-structured form representing the relation between variables and operators.

Figure 10:
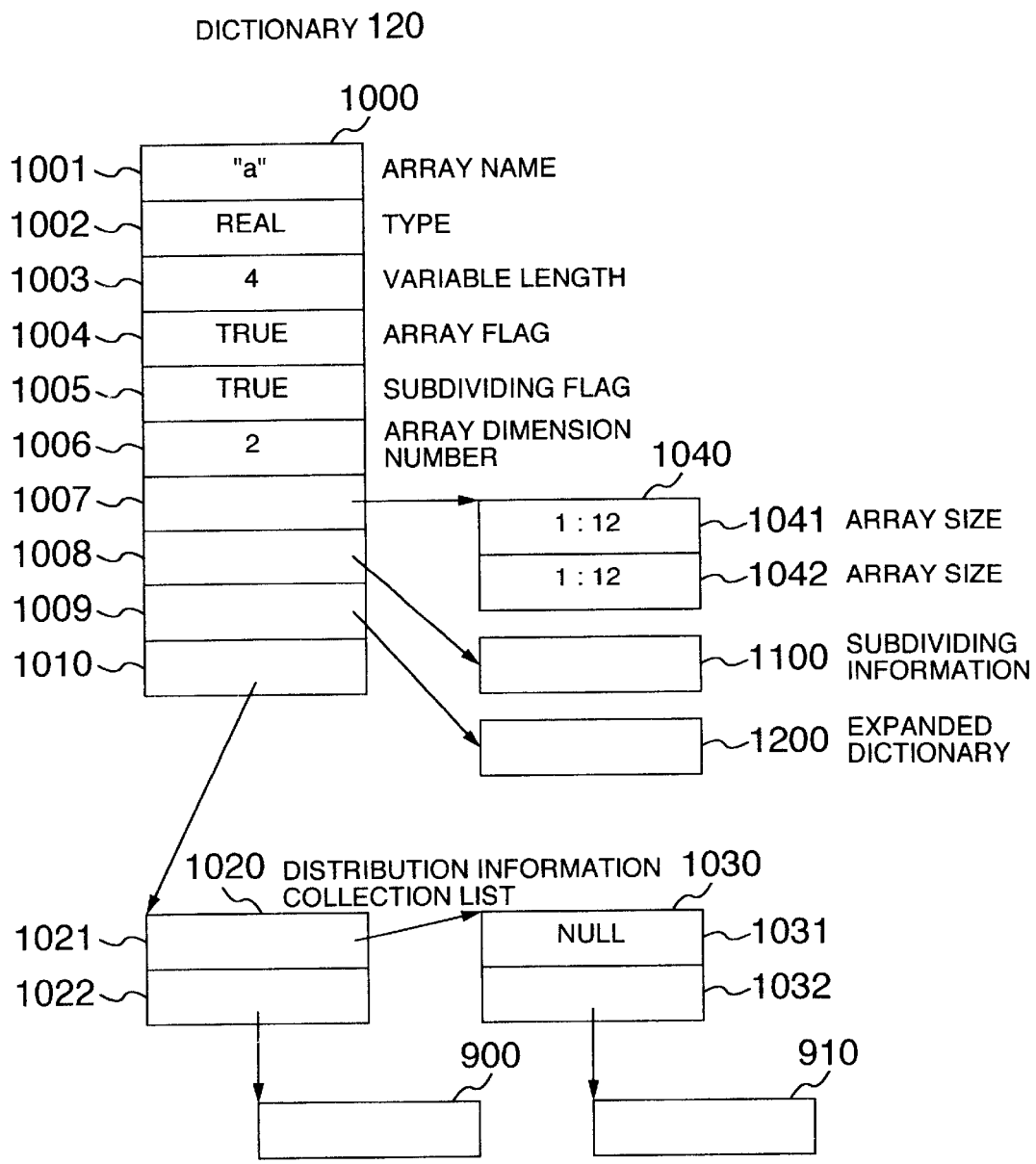
FIG. 10 is a diagram for explaining a dictionary for the source program.

FIG. 10 illustrates the dictionary 120 that the syntax analyzing unit 101 generates.

A reference numeral 1000 denotes the dictionary 120 for the array a. A dictionary for the scalar variables b, c is omitted in the present embodiment since it is not used in the explanation.

A reference numeral 1001 denotes a variable name, and a character array of "a", which is an array name, is set thereto. A reference numeral 1002 denotes a variable type, and "REAL", which indicates a real number type, is set thereto. A reference numeral 1003 denotes a variable length, and "4", which indicates a 4-byte variable, is set thereto. A reference numeral 1004 denotes a flag indicating whether or not the variable is an array. Since a is the array, "TRUE" is set thereto.

A reference numeral 1005 denotes a flag indicating whether or not to subdivide the array. "TRUE" indicates that the array should be subdivided. This value is set in the format type number judging unit 104.

A reference numeral 1006, when the variable is an array, denotes the number of the dimensions. Since the array a is a 2-dimensional array, a value 2 is set thereto. A reference numeral 1007, when the variable is an array, denotes a pointer pointing at an array dictionary 1040 that stores size declaration information of the respective dimensions of the array.

A reference numeral 1008 denotes a pointer pointing at subdivided information 1100. This is set in the array sub-dividing unit 105. A reference numeral 1009 denotes a pointer pointing at an expanded dictionary 1200. This is set in the array expanding unit 106. A reference numeral 1010 denotes a pointer pointing at a head 1020 of a collection list of the data distribution information. This is set in the format collecting unit 103.

A reference numeral 1040 denotes the array dictionary that stores the size declaration information of the respective dimensions of the array. This is pointed at from a field 1007 of the dictionary 1000. A reference numeral 1041 states that a lower limit value and an upper limit value in the 1st dimension of the array a are equal to 1 and 12, respectively. A reference numeral 1042 states that a lower limit value and an upper limit value in the 2nd dimension of the array a are equal to 1 and 12, respectively.

Figure 9:
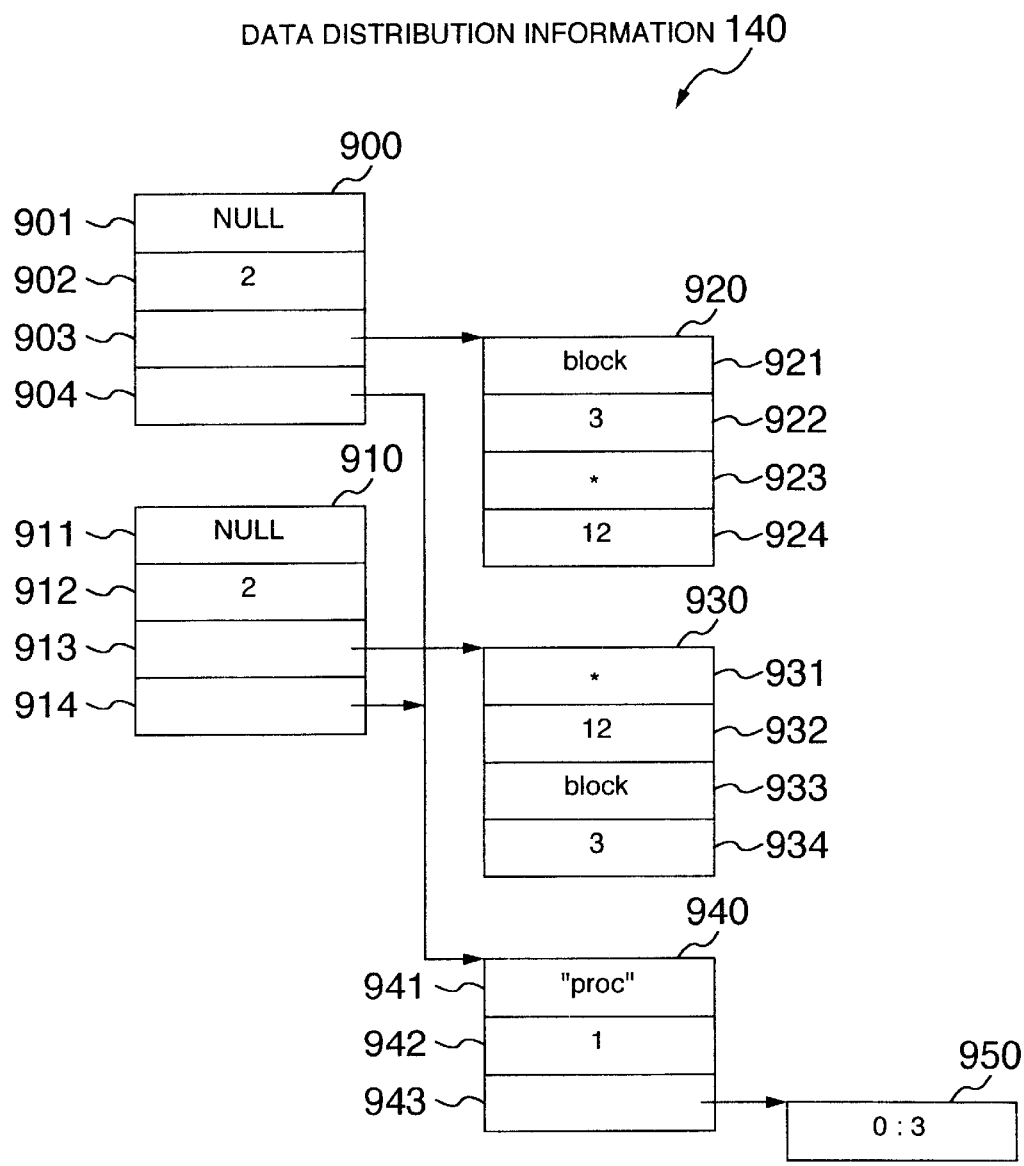
FIG. 9 is a diagram for explaining data distribution information for the source program.

The data distribution directive analyzing unit 102 inputs the dictionary 120 and the intermediate language 130, then outputting the data distribution information 140. FIG. 9 illustrates the data distribution information 140.

As explained above, the representation that is the same as the source program 110 in FIG. 8 is used as the intermediate language 130. Also, in FIG. 8, the data distribution information for the statement 802 is the same as that for the statement 804. Accordingly, here, there are presented only data distribution information for the statements 804, 810 and only logical processor information for the statement 801.

A reference numeral 940 denotes a PROCESSORS information table obtained by analyzing the PROCESSORS directive 801. A reference numeral 941 denotes a character array "proc" that represents variable name of a logical processor. A reference numeral 942 denotes the number of array dimensions of the logical processor, and a value 1 indicates that the array is 1-dimensional.

A reference numeral 943 denotes a pointer pointing at an array dictionary 950 that represents size information of the respective dimensions of the logical processor. A reference numeral 950 denotes the array dictionary that represents the size information of the respective dimensions of the logical processor. This indicates that a lower limit value and an upper limit value in the 1st dimension of the logical processor proc are equal to 0 and 3, respectively. A reference numeral 900 denotes a data distribution information table for the array a that is obtained by analyzing the data redistribution directive 804.

A reference numeral 901 denotes a pointer pointing at the other variables the data distribution information of which is varied toward the data redistribution directive 804. In this case, there exists no such variables, and accordingly a value NULL is set thereto. A reference numeral 902 denotes the number of dimensions of the array a, and a value 2 is set thereto. A reference numeral 903 denotes a pointer pointing at a per-dimension data distribution information table 920 indicating data distribution information for each dimension.

A reference numeral 904, which denotes a pointer pointing at the PROCESSORS information table for the logical processor, points at the PROCESSORS information table 940 for proc.

A reference numeral 920 denotes a per-dimension data distribution information table for the array a. A reference numeral 921 states that a distribution format of the 1st dimension is block-partitioning. A reference numeral 922 indicates that 3 consecutive array elements are allocated to each logical processor by the block-partitioning of the 1st dimension. This numerical value 3 is obtained by dividing 12, i.e., size of the 1st dimension of the array a that is obtained from the array dictionary 1040, by 4, i.e., the number of the logical processors obtained from the array dictionary 950, and then by rounding up a fraction to the right of the decimal point. In this case, this numerical value becomes equal to 3. This calculating method is described in "High Performance Fortran Language Specification" cited earlier.

A reference numeral 923 states that the 2nd dimension is not distributed. A reference numeral 924 indicates that 12 consecutive array elements in the 2nd dimension are allocated to each logical processor. Namely, this means that all of the array elements in the 2nd dimension are allocated to each logical processor.

A reference numeral 910 denotes a data distribution information table for the array a that is obtained by analyzing the data redistribution directive 810. A reference numeral 911 denotes a pointer pointing at the other variables the data distribution information of which is varied toward the data redistribution directive 810. In this case, there exists no such variables, and accordingly a value NULL is set thereto.

A reference numeral 912 denotes the number of dimensions of the array a, and a value 2 is set thereto. A reference numeral 913 denotes a pointer pointing at a per-dimension data distribution information table 930 indicating data distribution information for each dimension. A reference numeral 914, which denotes a pointer pointing at the PROCESSORS information table for the logical processor, points at the PROCESSORS information table 940 for proc.

A reference numeral 930 denotes a per-dimension data distribution information table for the array a. A reference numeral 931 states that the 1st dimension is not distributed. A reference numeral 932 indicates that 12 consecutive array elements in the 1st dimension are allocated to each logical processor. Namely, this means that all of the array elements in the 1st dimension are allocated to each logical processor.

A reference numeral 933 states that a distribution format of the 2nd dimension is block-partitioning. A reference numeral 934 indicates that 3 consecutive array elements are allocated to each logical processor by the block-partitioning of the 2nd dimension. The calculating method of this numerical value 3 is the same as that in the case of 922.

The data distribution directive analyzing unit 102 is designed to obtain the data distribution information tables 900, 910 explained above. The processing performed thereby is simply a processing in which the ordinary syntax analyzing processing is executed in a state of being accompanied by the processing of calculating the numerical values in 922 and 934 from the size for each dimension and the number of the logical processors that are obtained from the dictionaries. Accordingly, the detailed algorithm concerned therewith will be omitted.

Next, the format collecting unit 103 inputs the data distribution information 140 so as to create collection lists for summarizing data distribution information for the respective variables, finally connecting a head of the collection list to the dictionary 120 of the variables.

The reference numerals 1020, 1030 denote the collection lists of the data distribution information created as described above. The reference numeral 1020 denotes the head among them and is pointed at from a field 1010 of the dictionary 1000.

A reference numeral 1021, which denotes a pointer pointing at the next collection list, points at the next collection list 1030. A reference numeral 1022 denotes a pointer pointing at the data distribution information table 900 that the format collecting unit 103 collects. A reference numeral 1031 denotes a pointer pointing at the next collection list. There exists no subsequent list, and accordingly a value NULL is set thereto. A reference numeral 1032 denotes a pointer pointing at the data distribution information table 910 that the format collecting unit 103 collects.

The format type number judging unit 104 inputs the dictionary 120 and the data distribution information 140 so as to judge the number of types of the array data distribution and judges that the array should be subdivided if the number of the types is equal to 2 or larger, finally causing the result to be reflected on the dictionary 120.

First, starting from the field 1010 of the dictionary 1000 for the array a, the collection lists 1020, 1030 are traced. Then, the data distribution information tables 900, 910 obtained from the tracing are found to have the different distribution formats (block, *), (*, block), respectively. This allows the number of the data distribution types to be determined as 2. As the result, it is judged that the array should be subdivided, and thus a value of the subdividing flag 1005 is set to TRUE.

The array subdividing unit 105 inputs the dictionary 120 and the data distribution information 140 so as to subdivide the array, then causing the result to be reflected on the dictionary 120.

Figure 2:
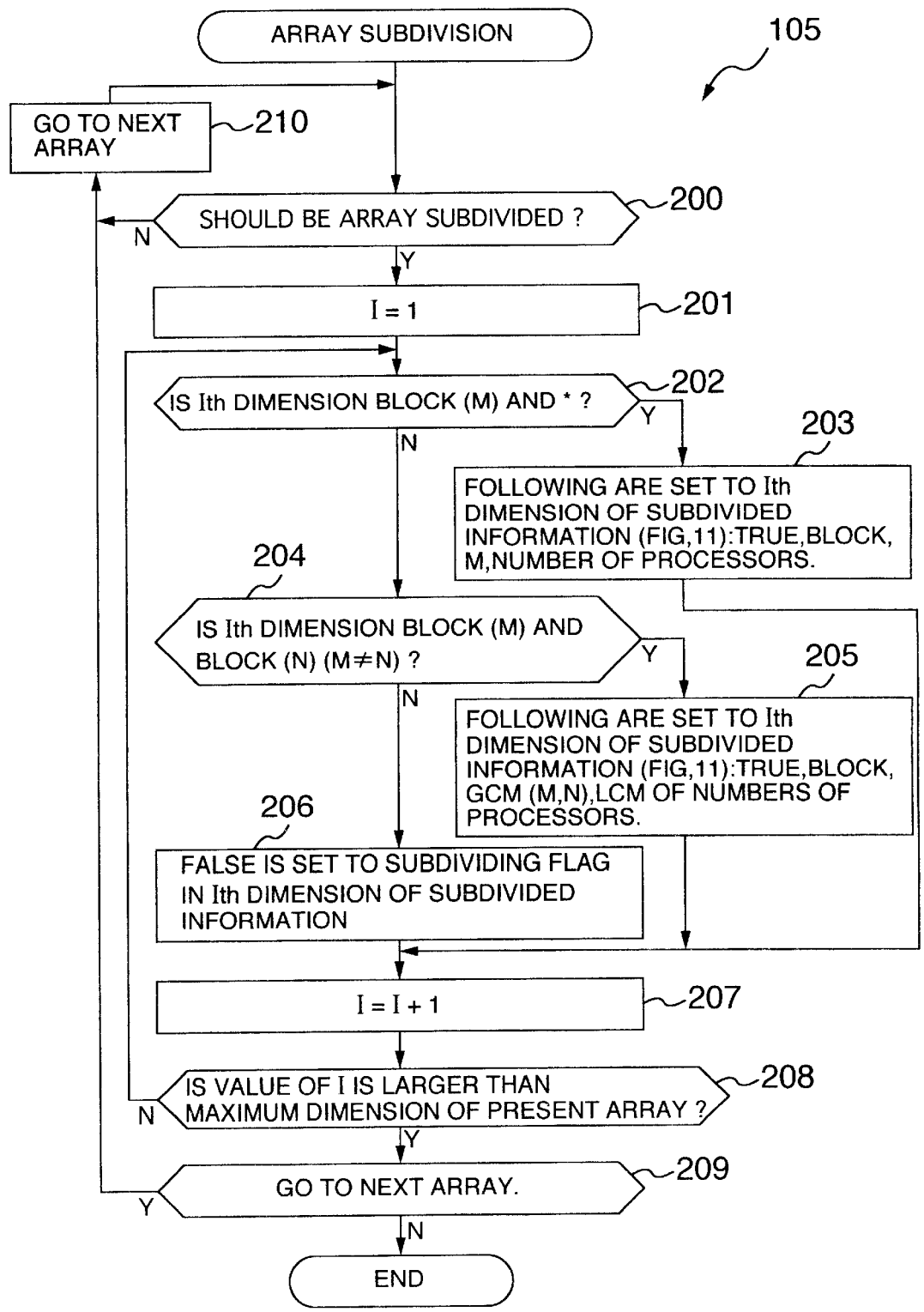
FIG. 2 is a flow chart for explaining a processing by an array subdividing unit.

FIG. 2 illustrates processing steps by the array subdividing unit 105. Hereinafter, the processing concerning the array a will be explained.

First, the value of the subdividing flag 1005 set by the format type number judging unit 104 has become TRUE. Consequently, the array a should be subdivided, and thus the answer to a step 200 turns out to be Yes.

Next, at a step 201, a value of I becomes equal to 1. Starting from the collection lists 1020, 1030, the data distribution information tables 900, 910 of the array a are traced. Then, from 921, 931 pointed at from the tables 900, 910, a data distribution format of the 1st dimension of the array a is found to be "block" and "*". In this case, since a value of m in a notation of the block-partitioning at a step 202 corresponds to the value 3 in 922, the answer to the step 202 turns out to be Yes.

At a step 203, the following are set in the 1st dimension of the subdivided information: The subdividing flag is set to TRUE, subdivision distribution is set to block, subdivision width m is set to 3, and subdivision PE (processor element) number is set to 4, i.e., the number of the logical processors corresponding to the block-distribution by the data distribution directive 804 instructing the block-distribution of the 1st dimension. If the data distribution format is found to be "m" and "n", proceed to steps 204, 205. At the step 205, the subdividing flag is set to TRUE, the subdivision distribution is set to block, the subdivision width is set to the greatest common measure (GCM) of m and n, and the subdivision PE number is set to the least common multiple (LCM) of the number of the logical processors corresponding to both of the data distribution directives.

Figure 11:
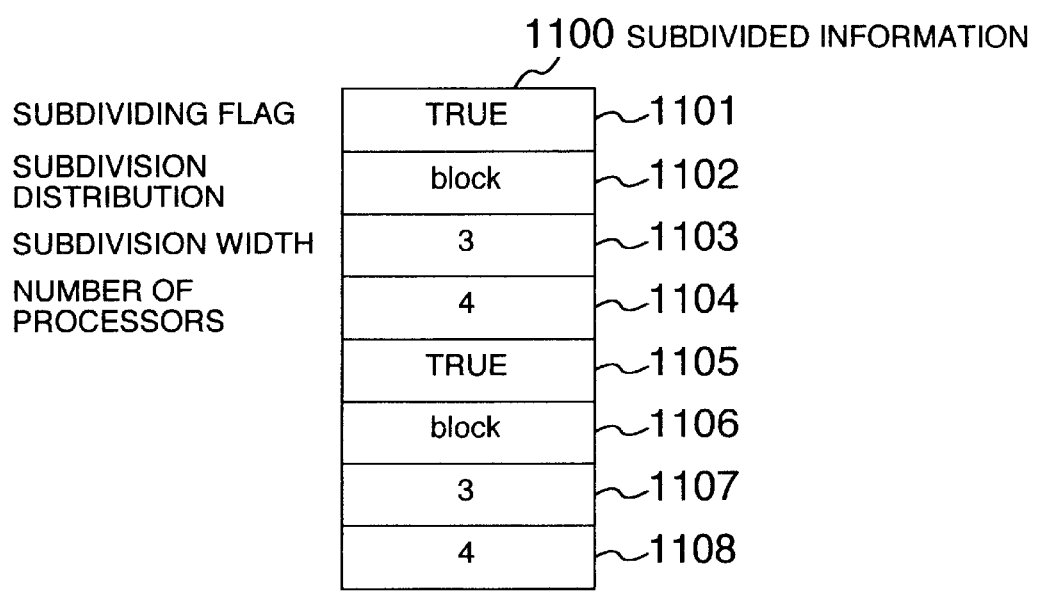
FIG. 11 is a diagram for explaining subdivided information based on the array subdividing.

FIG. 11 illustrates the subdivided information 1100. The reference numerals each denotes the following components: 1101 a value of the subdividing flag for the 1st dimension, 1102 the subdivision distribution for the 1st dimension, 1103 the subdivision width for the 1st dimension, 1104 the subdivision PE number for the 1st dimension, 1105 a value of the subdividing flag for the 2nd dimension, 1106 the subdivision distribution for the 2nd dimension, 1107 the subdivision width for the 2nd dimension, and 1108 the subdivision PE number for the 2nd dimension.

Now, the value of I is equal to 1. Thus, the information set at the step 203 is stored in the field for the 1st dimension of the subdivided information 1100. Namely, TRUE, i.e., the value of the subdividing flag, is stored in 1101, and block, i.e., the subdivision distribution, is stored in 1102, and 3, i.e., the subdivision width, is stored in 1103, and 4, i.e., the subdivision PE number, is stored in 1104.

Next, at a step 207 in FIG. 2, the value of I becomes equal to 2. Since the array a is 2-dimensional, the answer to a step 208 turns out to be No. Thus, the processing goes back to the step 202. Starting from the collection lists 1020, 1030, the data distribution information tables 900, 910 of the array a are traced. Then, from 923, 933 pointed at from the tables 900, 910, a data distribution format of the 2nd dimension of the array a is found to be "*" and "block". In this case, since a value of m in the notation of the block-partitioning at the step 202 corresponds to the value 3 in 934, the answer to the step 202 turns out to be Yes.

At the step 203, the following are set in the 2nd dimension of the subdivided information: The subdividing flag is set to TRUE, the subdivision distribution is set to block, the subdivision width m is set to 3, and the subdivision PE number is set to 4, i.e., the number of the logical processors corresponding to the block-distribution by the data distribution directive 810 instructing the block-distribution of the 2nd dimension.

Now, the value of I is equal to 2. Thus, the information set at the step 203 is stored in the field for the 2nd dimension of the subdivided information 1100. Namely, TRUE, i.e., the value of the subdividing flag, is stored in 1105, and block, i.e., the subdivision distribution, is stored in 1106, and 3, i.e., the subdivision width, is stored in 1107, and 4, i.e., the subdivision PE number, is stored in 1108.

Next, at the step 207, the value of I becomes equal to 3. Since the array a is 2-dimensional, the answer to the step 208 turns out to be Yes. Now, there exists no other data distribution array. Accordingly, the answer to a step 209 turns out to be No and thus the processing is finished.

The array expanding unit 106 inputs the dictionary 120 and the data distribution information 140 and expands an array declaration, thereby modifying sequence of addresses of the array elements and then causing the result to be reflected on the dictionary 120.

Figure 3:
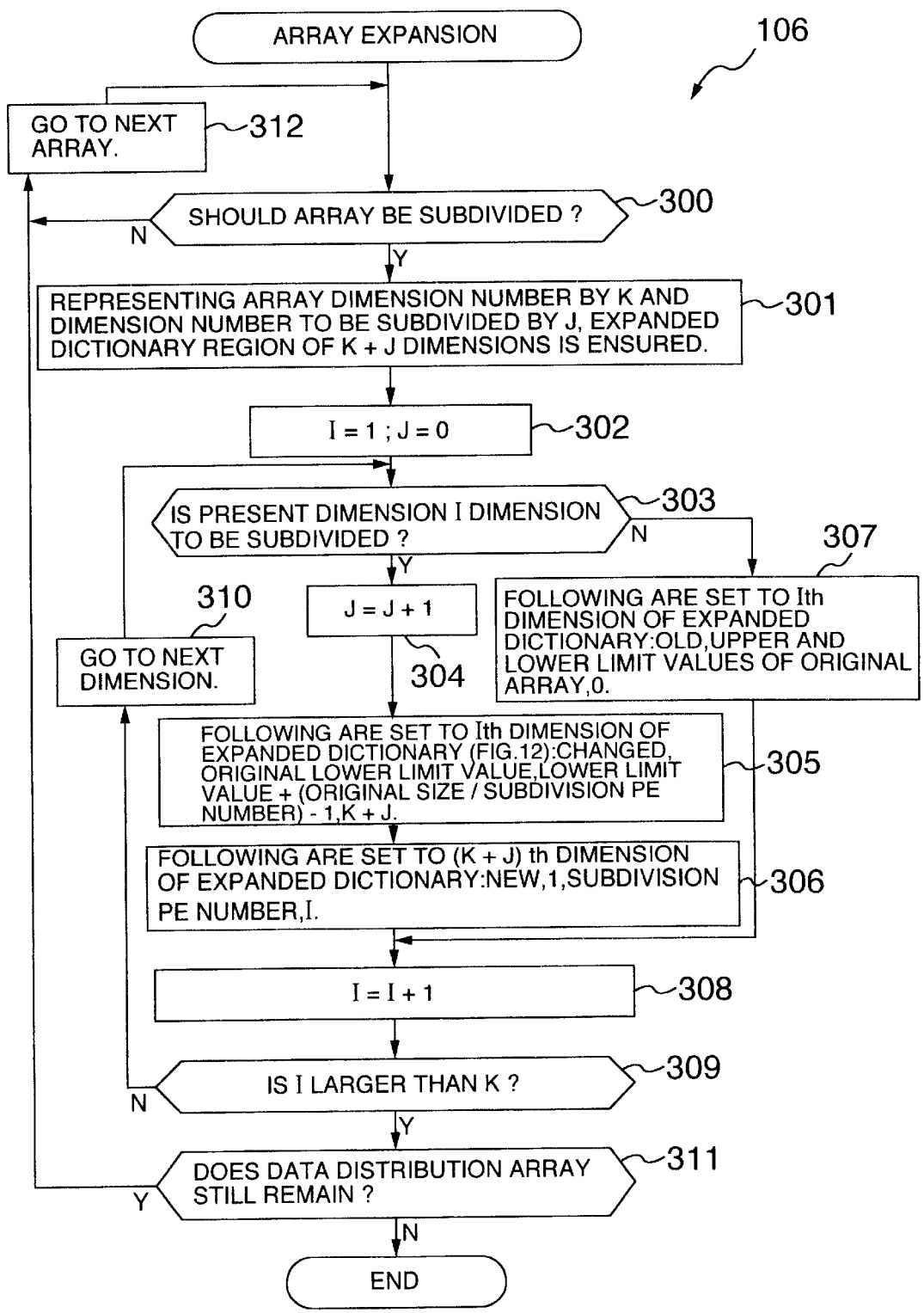
FIG. 3 is a flow chart for explaining a processing by an array expanding unit.

FIG. 3 illustrates processing steps by the array expanding unit 106. Hereinafter, the processing concerning the array a will be explained.

First, the value of the subdividing flag 1005 set by the format type number judging unit 104 has become TRUE. Consequently, the array a should be subdivided, and thus the answer to a step 300 is Yes.

Since K, i.e., the number of the array dimensions, is equal to 2 from a field 1006 in the dictionary 1000 of the array a. Moreover, since TRUE is set to both of the flags 1101, 1105 in the subdivided information 1100, J, i.e., the number of the dimensions to be subdivided, is equal to 2. Thus, K+J=4, and accordingly, at a step 301, a region for an expanded dictionary by the amount of the 4 dimensions is ensured.

Figure 12:
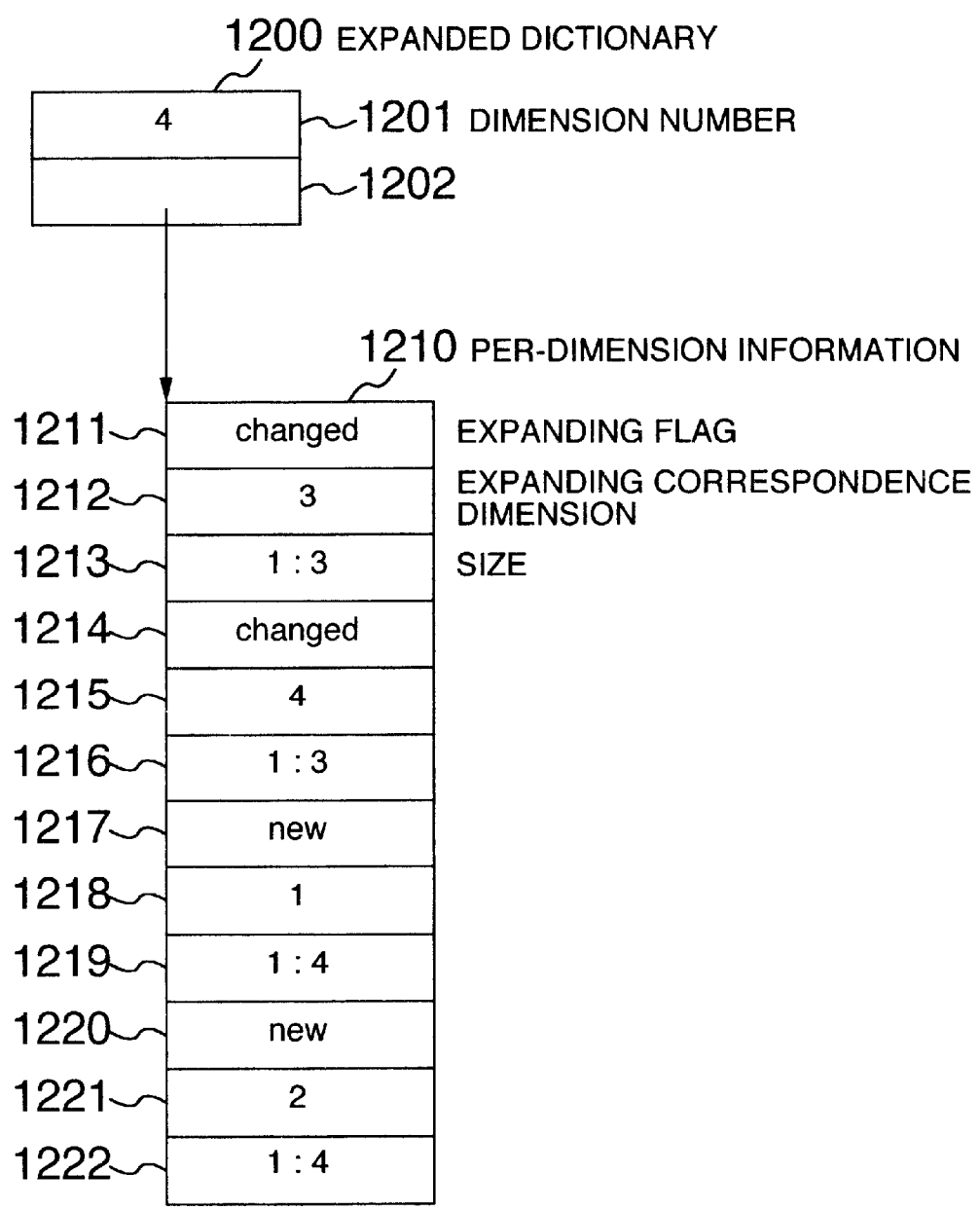
FIG. 12 is a diagram for explaining an expanded dictionary based on the array expanding.

FIG. 12 illustrates the expanded dictionary 1200. The reference numerals each denote the following: 1201 the number of the array dimensions after being expanded, 1202 a pointer pointing at an information table 1210 for each of the array dimensions after being expanded, 1210 the per-dimension information table, and 1211, 1214, 1217 and 1220 expanding flags in the 1st, 2nd, 3rd and 4th dimension of the array after being expanded, respectively. Toward the expanding flags, "changed" is set in the case of a dimension to be expanded, "new" is set in the case of a dimension newly generated by the expanding, and "not changed" is set in the case of a dimension not to be expanded.

Furthermore, reference numerals 1212, 1215, 1218 and 1221 denote expanding correspondence dimensions in the 1st, 2nd, 3rd and 4th dimension of the array after being expanded, respectively. The setting of dimensions is carried out as follows: In the case of a dimension to be expanded, a newly generated dimension corresponding to the dimension is set. In the case of a dimension newly generated by the expanding, the original dimension to be expanded is set. In the case of a dimension not to be expanded, 0 is set. Upper and lower limit values in the 1st, 2nd, 3rd and 4th dimension of the array after being expanded are set to 1213, 1216, 1219 and 1222, respectively.

Next, at a step 302 in FIG. 3, the values of I, J become equal to 1, 0, respectively. Since the value of the subdividing flag 1101 in the 1st dimension in the subdivided information 1100 has become TRUE, the answer to a step 303 is Yes. Next, at a step 304, the value of J is made equal to 1.

At a step 305, "changed" is set to the expanding flag 1211 in the 1st dimension of the expanded dictionary 1200. From the lower limit value, i.e., 1 and the upper limit value, i.e., 12 in the 1st dimension of the array a that are indicated in 1041 in the dictionary 1000 and the subdivision PE number, i.e., 4 indicated in the field 1104 in the subdivided information 1100, the lower limit value after the subdivision becomes equal to 1. Moreover, the upper limit value after the subdivision becomes equal to 3, which is obtained from the following formula and computation: the upper limit value= the lower limit value+(the original size/the subdivision PE number)−1, i.e., 1+(12/4)−1=3. The resultant combination of the lower limit value and the upper limit value, i.e., 1:3, is set to the field 1213 for the 1st dimension of the expanded dictionary 1200. Also, a value of the expanding correspondence dimension K+J, i.e., 3, is set to the field 1212.

At a step 306, "new" is set to the expanding flag 1217 in the K+J=3rd dimension of the expanded dictionary 1200. Taking the lower limit value as 1 and the upper limit value as 4, i.e., the subdivision PE number, the resultant combination of the lower limit value and the upper limit value, i.e., 1:4, is set to the field 1219. Also, the value of the expanding correspondence dimension I, i.e., 1, is set to the field 1218.

At a step 308, the value of I becomes equal to 2. The value of I, i.e., 2 is not larger than that of K, i.e., 2, and accordingly the answer to a step 309 turns out to be No. Thus, at a step 310, the processing is transferred to the next dimension and goes back to the step 303. Since the value of the subdividing flag 1105 in the 2nd dimension in the subdivided information 1100 has become TRUE, the answer to the step 303 turns out to be Yes. At the step 304, the value of J becomes equal to 2.

At the step 305, "changed" is set to the expanding flag 1214 in the 2nd dimension of the expanded dictionary 1200. From the lower limit value, i.e., 1 and the upper limit value, i.e., 12 in the 2nd dimension of the array a that are indicated in 1042 in the dictionary 1000 and the subdivision PE number, i.e., 4 indicated in the field 1108 in the subdivided information 1100, the lower limit value after the subdivision becomes equal to 1. Moreover, the upper limit value after the subdivision becomes equal to 3, which is obtained from the computation: 1+(12/4)−1=3. The resultant combination of the lower limit value and the upper limit value, i.e., 1:3, is set to the field 1216 for the 2nd dimension of the expanded dictionary 1200. Also, the value of the expanding correspondence dimension K+J, i.e., 4, is set to the field 1215.

At the step 306, "new" is set to the expanding flag 1220 in the K+J=4th dimension of the expanded dictionary 1200. Taking the lower limit value as 1 and the upper limit value as 4, i.e., the subdivision PE number, the resultant combination of the lower limit value and the upper limit value, i.e., 1:4, is set to the field 1222. Also, the value of the expanding correspondence dimension I, i.e., 2, is set to the field 1221.

At the step 308, the value of I becomes equal to 3. The value of I, i.e., 3 is larger than that of K, i.e., 2, and accordingly the answer to the step 309 turns out to be Yes.

Now, the exists no other data distribution array. Consequently, the answer to a step 311 turns out to be No and thus the array expanding processing is completed.

Next, the program transforming unit 107 inputs the dictionary 120, the data distribution information 140 and the intermediate language 130 so as to transform the program, then causing the result to be reflected on the intermediate language 130. The program transforming unit 107 also performs a program transformation for outputting the loop table 150. In addition, the program transforming unit 107 includes the loop transforming unit 1071 and the subscript modifying unit 1072.

Here, as the intermediate language 130, the explanation will be given employing, as the object, only the loop k corresponding to the statements 803, 817 in FIG. 8 and only the loop j and the loop i from the statement 805 to the statement 809. The processing will be omitted that concerns the loop j corresponding to the statements 811, 815 and the loop i corresponding to the statement 812 to the statement 814.

Figure 4:
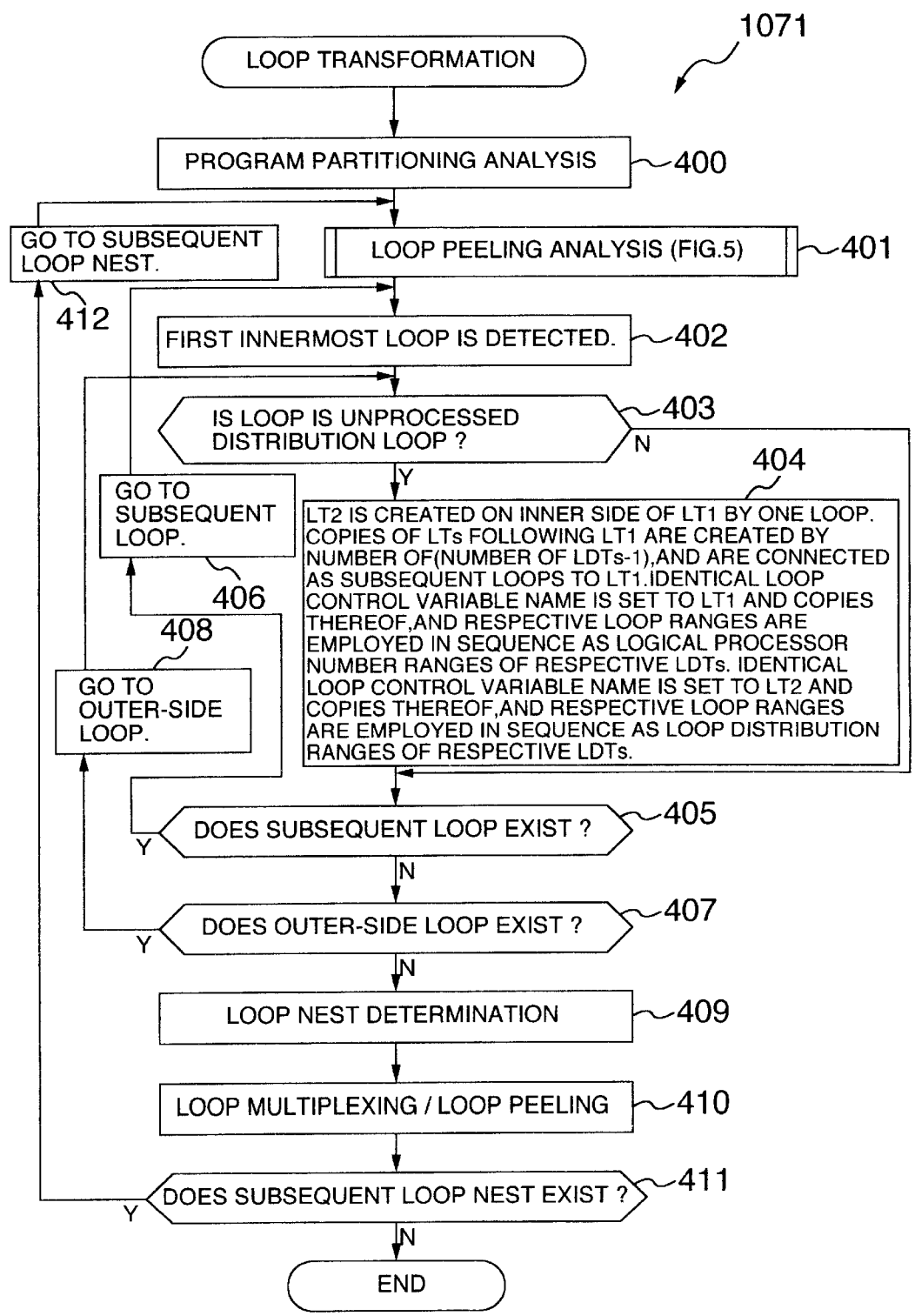
FIG. 4 is a flow chart for explaining a processing by a loop transforming unit.

FIG. 4 illustrates processing steps by the loop transforming unit 1071. At a program partitioning analysis step 400, the dictionary 120, the data distribution information 140 and the intermediate language 130 are inputted and then the loop table 150 is outputted.

Figure 13:
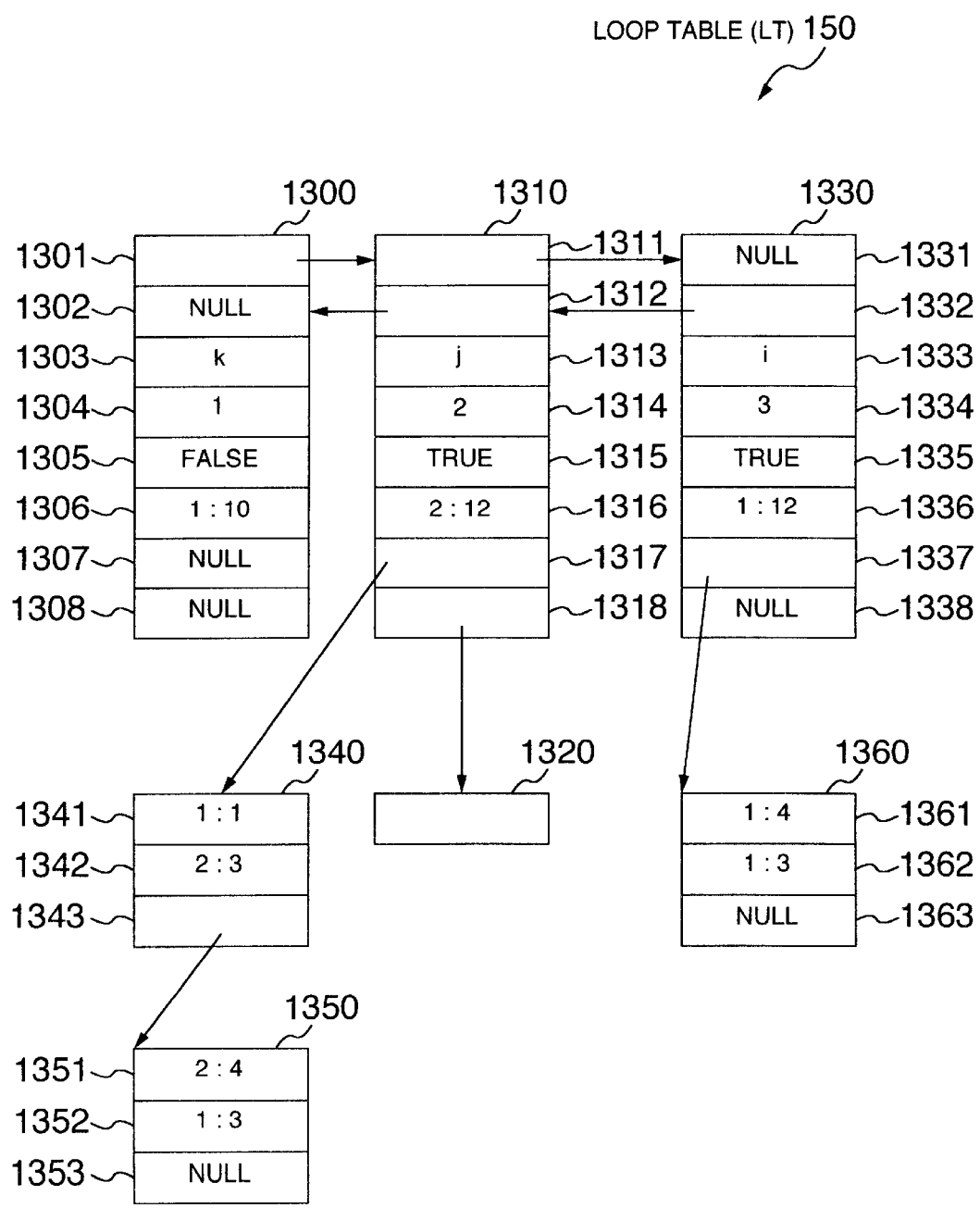
FIG. 13 is a diagram for explaining a loop table and a loop distribution range table for the source program.

FIG. 13 illustrates the loop table (LT) 150. The reference numerals each denote the following: 1300 a loop table of the loop k corresponding to the statements 803, 817 in FIG. 8, 1310 a loop table of the loop j corresponding to statements 805, 809, 1330 a loop table of the loop i corresponding to the statement 806 to the statement 808, and 1320 a loop table of the loop j corresponding to statements 811, 815. A loop table of the loop i corresponding to the statement 812 to the statement 814 has been omitted because it is not used in the explanation, but the loop table is connected from the loop table 1320.

A reference numeral 1301, which denotes a pointer pointing at a loop table of a head loop among a group of loops situated on the inner side of the loop k by one loop, points at the loop table 1310. A reference numeral 1302 denotes a pointer pointing at a loop table of a loop situated on the outer side of the loop k by one loop. Concerning the loop k, however, there exists no such loop. Accordingly, a value NULL is set to the pointer 1302. A reference numeral 1303, which denotes a pointer pointing at a dictionary of a loop control variable of the present loop, specifies k. A reference numeral 1304 denotes a loop nest. Since the loop nest is the outermost loop, a value 1 is set thereto. A reference numeral 1305 denotes a flag indicating whether or not to perform a peeling of the present loop. This is set at a loop peeling analysis step 401. A reference numeral 1306 indicates upper and lower limit values of the loop, and a lower limit value 1 and an upper limit value 10 are set thereto. A reference numeral 1307 denotes a pointer pointing at a head table of program partition tables created as the result of program-partitioning the loop. Since the loop k is not a loop to be program-partitioned, the value NULL is set to the pointer 1307. A reference numeral 1308 denotes a pointer pointing at a loop table of a loop subsequent to the loop k. Concerning the loop k, however, there exists no subsequent loop. Accordingly the value NULL is set to the pointer 1308.

Similarly, a reference numeral 1311 denotes a pointer pointing at the loop table 1330 of the loop i situated on the inner side of the loop j by one loop. A reference numeral 1312 denotes a pointer pointing at the loop table 1300 of the loop k situated on the outer side of the loop j by one loop. A reference numeral 1313 denotes a pointer pointing at a dictionary of the loop control variable j of the loop j. A reference numeral 1314 denotes a loop nest of the loop j to which a value 2 is set. A reference numeral 1315 denotes a flag indicating whether or not to perform a peeling of the loop j. A reference numeral 1316 indicates upper and lower limit values of the loop j. A reference numeral 1317 denotes a pointer pointing at a head table 1340 of program partitioning tables. A reference numeral 1318 denotes a pointer pointing at the loop table 1320 of the subsequent loop, i.e., the loop j corresponding to the statements 811, 815.

Similarly, a reference numeral 1331 denotes a pointer to which the value NULL is set since a loop does not exist that is situated on the inner side of the loop i. A reference numeral 1332 denotes a pointer pointing at the loop table 1310 of the loop j situated on the outer side of the loop i. A reference numeral 1333 denotes a pointer pointing at a dictionary of the loop control variable i of the loop i. A reference numeral 1334 denotes a loop nest of the loop i to which a value 3 is set. A reference numeral 1335 denotes a flag indicating whether or not to perform a peeling of the loop i. A reference numeral 1336 indicates upper and lower limit values of the loop i. A reference numeral 1337 denotes a pointer pointing at a head table 1360 of program partition tables. A reference numeral 1338 denotes a pointer to which the value NULL is set since there exists no subsequent loop. Of the content of the loop tables, the above-described content can be obtained easily from the intermediate language 130.

Reference numerals 1340, 1350 denote the program partition tables for the loop j. A reference numeral 1341 indicates a range of the logical processor number in which the present table is effective and states that the present table is effective for the logical processor number 1. A reference numeral 1342 denotes upper and lower limit values of the loop after being program-partitioned, and indicates that the lower limit value is equal to 2 and the upper limit value is equal to 3. A reference numeral 1343, which denotes a pointer pointing at the next program partition table, points at the program partition table 1350. A reference numeral 1351 indicates a range of the logical processor number in which the present table is effective and states that the present table is effective for the logical processor numbers 2 to 4. A reference numeral 1352 denotes upper and lower limit values of the loop after being program-partitioned, and indicates that the lower limit value is equal to 1 and the upper limit value is equal to 3. A reference numeral 1353 denotes a pointer pointing at the next program partition table. However, there exists no subsequent program partition table, and thus the value NULL is set to the pointer 1353.

From the above-described two program partition tables, toward the logical processor number 1, the upper and lower limit values of the loop j each become equal to 2, 3. Also, toward the logical processor numbers 2 to 4, the upper and lower limit values of the loop j each become equal to 1, 3.

The processing for obtaining the above-described program partition tables has been explained in detail in Seema Hiranandani, Ken Kennedy, Chau-Wen Tseng, "Compiling Fortran D for MIMD Distributed-Memory Machines", Communications of the ACM, Vol. 35, No. 8, August, 1992, pp. 66–80.

Next, at the loop peeling analysis step 401, array reference tables and the loop tables in the intermediate language 130 are inputted and then information after the loop peeling is added to the above-described respective tables.

Figure 14:
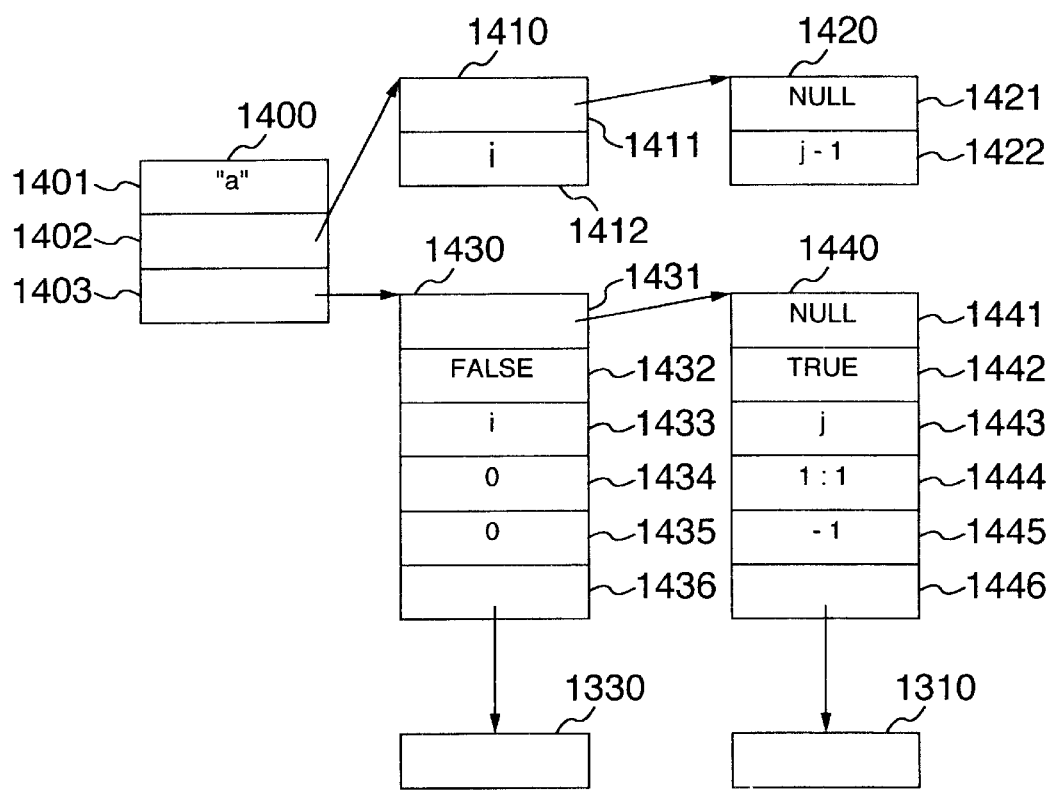
FIG. 14 is a diagram for explaining an array reference table and a peeling table for the source program.

FIG. 14 illustrates an array reference table for an array reference a (i, j−1) in the statement 807. A reference numeral 1400 denotes the array reference table for the array reference a (i, j−1).

A reference numeral 1401 denotes a pointer pointing at the dictionary of the array a. A reference numeral 1402, which denotes a pointer pointing at a head of subscript tables representing subscript information in each dimension of the array, points at a reference numeral 1410. A reference numeral 1403, which denotes a pointer pointing at a table representing peeling information for each dimension, points at a reference numeral 1430. This is set at the loop peeling analysis step 401. The reference numeral 1410 denotes a subscript table in the 1st dimension of the array reference a (i, j−1). A reference numeral 1411, which denotes a pointer pointing at a subscript table in the 2nd dimension, points at a reference numeral 1420. A reference numeral 1412, which denotes a pointer pointing at an intermediate language indicating an subscript, points at an intermediate language indicating i. The reference numeral 1420 denotes the subscript table in the 2nd dimension of the array reference a (i, j−1). The 3rd dimension does not exist in the array a, and accordingly a value NULL is set to a pointer 1421. A reference numeral 1422, which denotes a pointer pointing at an intermediate language indicating an subscript, points at an intermediate language indicating j−1. Reference numerals 1430, 1440, which denote tables created in the loop peeling analysis described hereinafter, will be explained in the processing therein.

Figure 5:
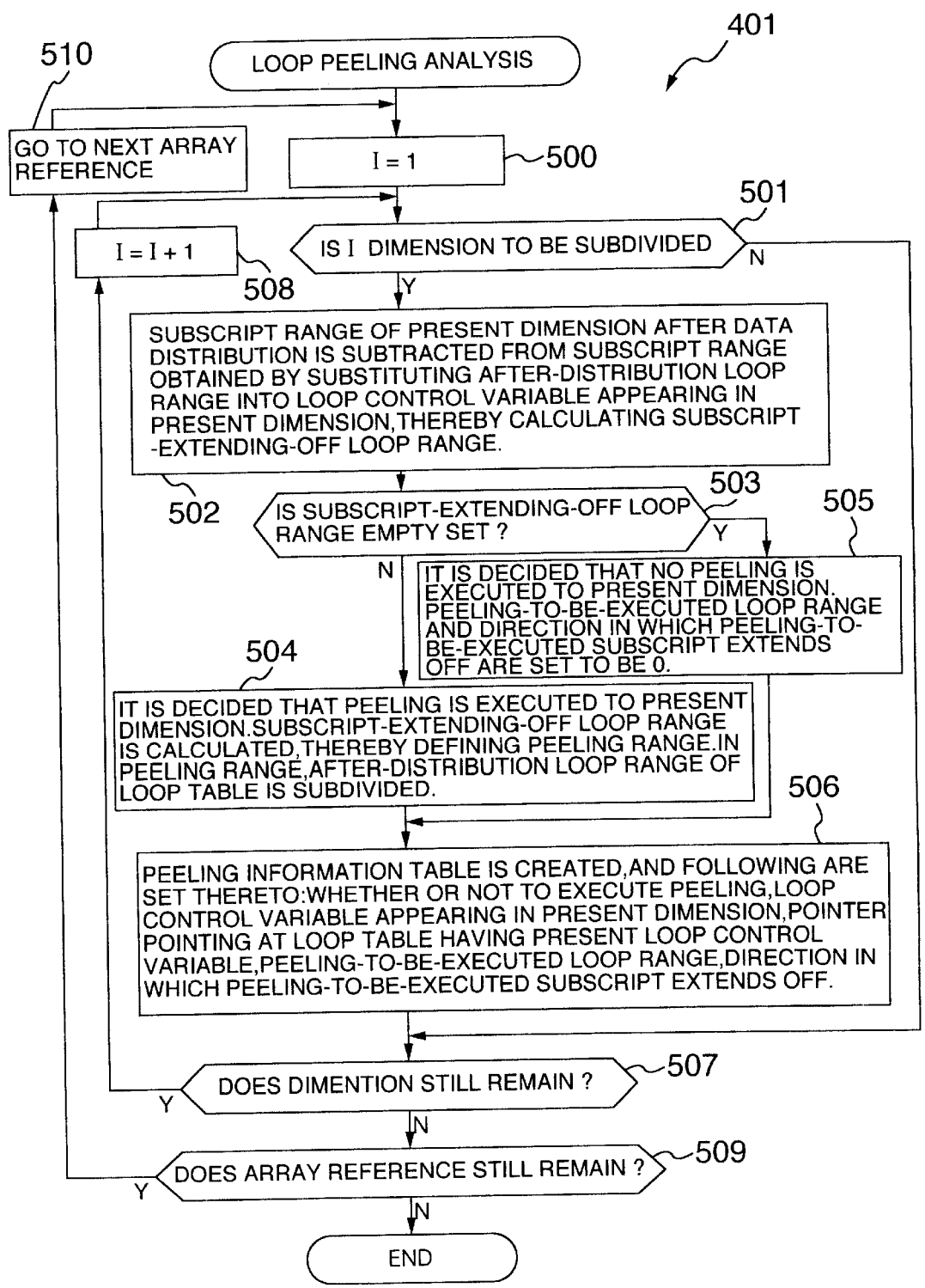
FIG. 5 is a flow chart for explaining a loop peeling analysis processing.

FIG. 5 illustrates detailed processing steps at the loop peeling analysis step 401. Here, the explanation will be given concerning only the processing about the array reference table 1400 illustrated in FIG. 14.

At a step 500, a value of I becomes equal to 1. Since TRUE has been set to the field 1101 in the subdivided information 1100, the 1st dimension of the array a should be subdivided. Thus, the answer to a step 501 proves to be Yes.

From the pointer 1412, the variable appearing in the present dimension is i, and from the loop table 1330, i is a loop control variable. Then, by substituting an after-distribution loop range 1362 into i, a subscript range of the present dimension is found to be 1:3. Meanwhile, from a field 1213 of the expanded dictionary 1200, a subscript range of the present dimension after the data distribution is equal to 1:3. Accordingly, subtracting the subscript range after the data distribution, i.e., 1:3, from the subscript range obtained from the after-distribution loop range, i.e., 1:3, results in an empty set. Namely, the remaining range resulting from the subtraction proves to be the empty set. Thus, the result at a step 502 is the empty set and the answer to a step 503 proves to be Yes.

At a step 505, it is decided that no peeling is executed in the present dimension and that both of the following two quantities are set to be 0: A loop range that is to undergo the peeling and a direction in which a subscript that is to undergo the peeling extends off.

Next, at a step 506, the peeling information table 1430 is created. Here, the reference numerals each denote the following: 1431 a pointer pointing at the next peeling information table, 1432 a flag indicating whether or not to perform the peeling, 1433 the loop control variable appearing in the present dimension, 1434 the loop range that is to undergo the peeling, 1435 the direction in which a subscript that is to undergo the peeling extends off, and 1436 a pointer pointing at a loop table having the present loop control variable.

Consequently, in this case, NULL is set to the field 1431 first. In the next processing in the 2nd dimension, however, the field 1431 is modified so that it points at a newly created peeling information table 1440. Concerning the other fields, the setting is carried out as follows: FALSE is set to 1432 because no peeling is executed. The loop control variable appearing in the present dimension, i.e., i, is set to 1433. The value 0 is set to both 1434 and 1435. A pointer pointing at the loop table 1330 for the loop i is set to 1436.

Next, at a step 507, the answer thereto is Yes because, at present, the processing in the 1st dimension is performed. At a step 508, the value of I becomes equal to 2. Since TRUE has been set to the field 1105 in the subdivided information 1100, the 2nd dimension of the array a should be subdivided. Thus, the answer to the step 501 is Yes.

From the pointer 1422, the variable appearing in the present dimension is j, and from the loop table 1310, j is a loop control variable. Then, by substituting the after-distribution loop ranges 1342, 1352 into j and taking into consideration simultaneously the ranges of the logical processor number in 1341, 1351, the subscript range of the present dimension is found to be 1:2 when the range of the logical processor number is equal to 1:1 and is found to be 0:2 when the range of the logical processor number is equal to 2:4.

Meanwhile, from a field 1216 of the expanded dictionary 1200, the subscript range of the present dimension after the data distribution is equal to 1:3. Accordingly, the remaining range obtained by subtracting the subscript range after the data distribution from the subscript range obtained from the after-distribution loop range proves to be 0:0 when the range of the logical processor number is equal to 2:4. Thus, the result at the step 502 is 0:0, and the answer to the step 503 proves to be No.

At a step 504, at first, it is decided that the peeling is executed in the present dimension. Next, the value 0:0 becomes equal to j−1, i.e., the subscript in the 2nd dimension, thereby letting the value of j be equal to 1:1. Accordingly, a peeling range is equal to 1:1. Here, the peeling range is defined as the loop range at the time when the above-mentioned remaining range does not become the empty set but becomes a finite set, i.e., extends off. Also, this peeling range occurs when the range of the logical processor number is equal to 2:4. Consequently, of the after-distribution loop ranges of the loop table 1310, the table 1350 corresponding to the above-mentioned range of the logical processor number is subdivided. Namely, the table 1350 is divided into a table having a range equal to the peeling range 1:1 and the other tables having the other ranges.

Figure 15:
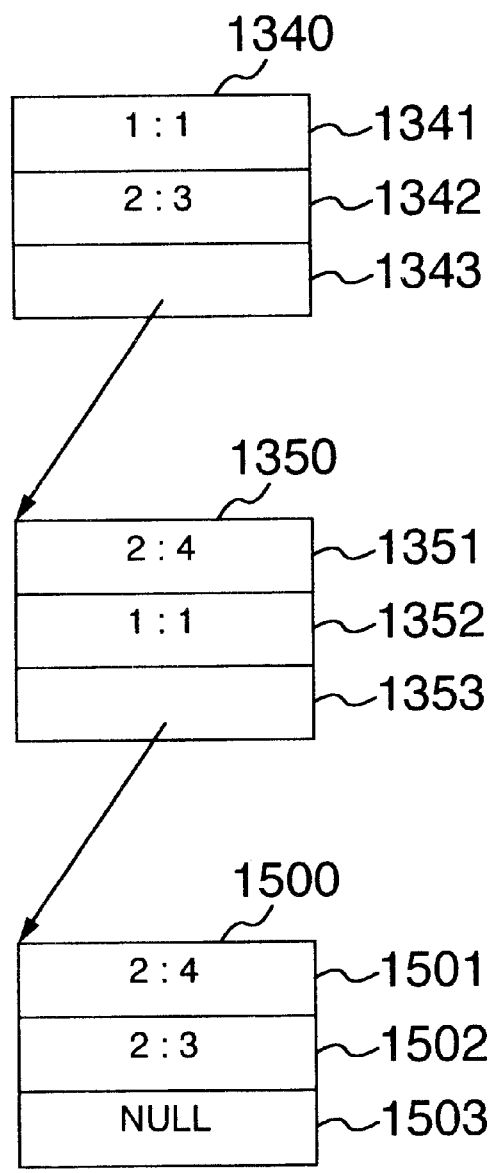
FIG. 15 is a diagram for explaining the loop distribution range table after subdividing the loop range.

FIG. 15 illustrates a loop distribution range table (LDT) after the subdivision. The loop distribution range in the table 1350 has been modified from 1:3 to 1:1. A table 1500 is newly created, and a field 1353 points at the table 1500. The range of the logical processor number of the loop distribution range to be subdivided, i.e., 2:4, is set to 1501. The range 2:3, which has been obtained by subtracting the range 1:1 from the original loop distribution range 1:3, is set to 1502. Since there exists no other table for a field 1503 to point at, a value NULL is set thereto.

Next, at the step 506, the peeling information table 1440 is created.

First, since there exists no subsequent table for a field 1441 to point at, NULL is set thereto. A pointer pointing at 1440 is set to 1431. A flag TRUE, which states that the peeling will be executed, is set to 1442. The loop control variable appearing in the present dimension, i.e., j, is set to 1443. The peeling range 1:1, which has been calculated at the step 504, is set to 1444. Of the after-distribution loop ranges 1342, 1352, the lower limit vale of the range 1352 is included in the range 1:1. Consequently, −1, i.e., a numeral indicating a lower limit value direction as the direction in which the subscript extends off, is set to 1445. Finally, a pointer pointing at the loop table 1310 for the loop j is set to 1446.

Next, since, in the array a, there exists no subsequent dimension to be processed, the answer to the step 507 proves to be No. As explained earlier, in FIG. 5, the explanation has been and will be given concerning only the processing about the array reference in FIG. 14. Accordingly, the answer to a step 509 proves to be No, and thus the explanation of the loop peeling processing is finished here.

Figure 16:
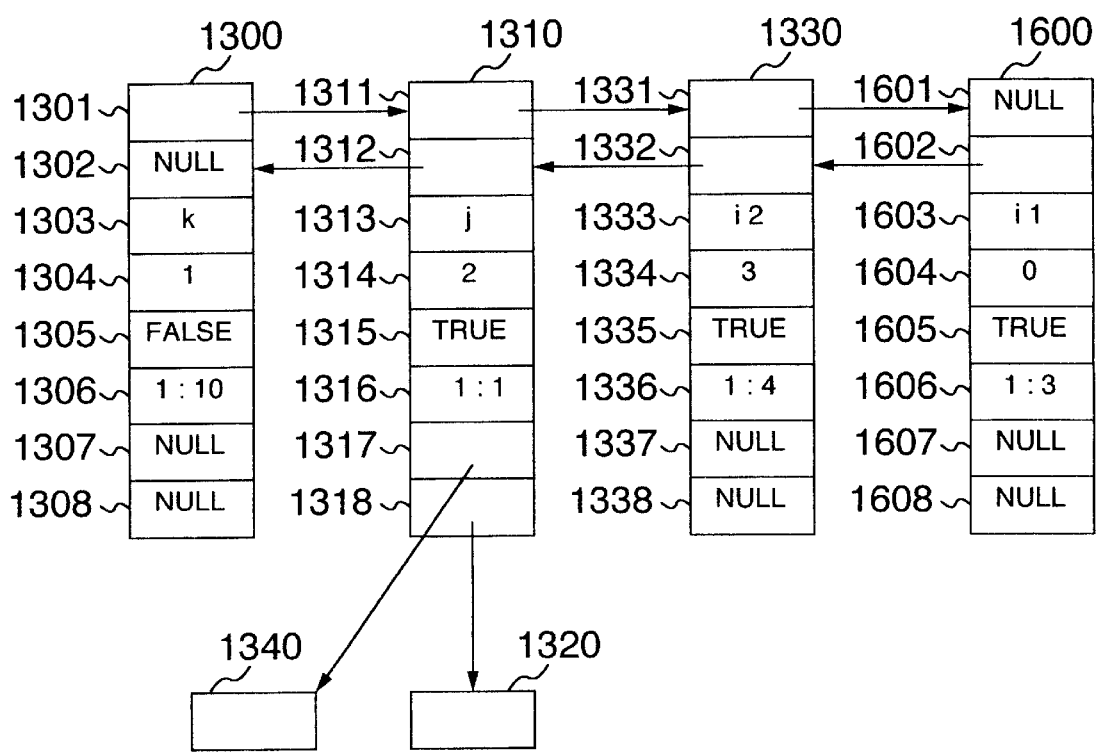
FIG. 16 is a diagram for explaining the loop table after subdividing the loop range of a loop i.
Figure 17:
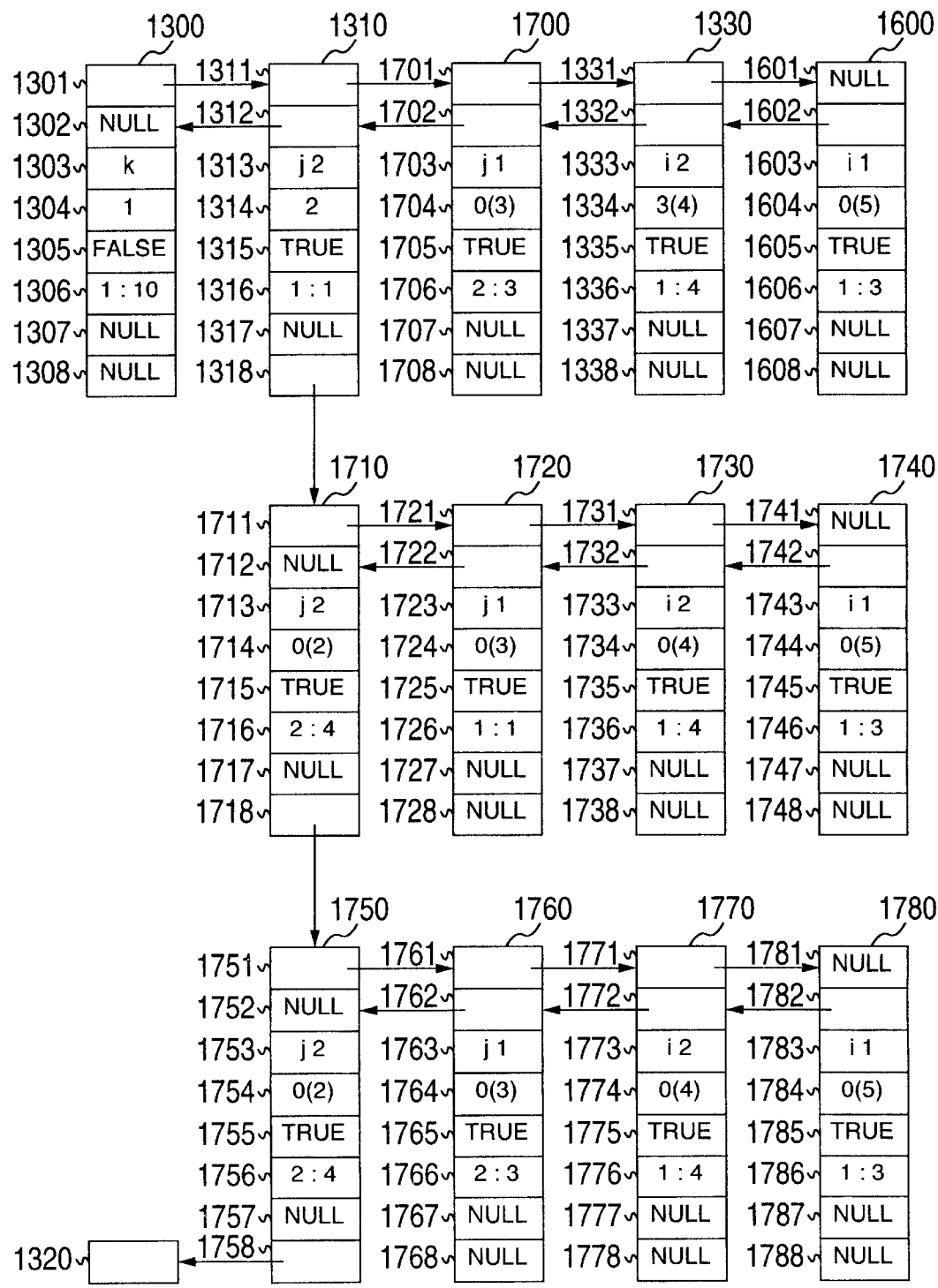
FIG. 17 is a diagram for explaining the loop table after subdividing the loop range of a loop j.

Here, getting back to FIG. 4, the explanation of the loop transformation is continued. In the remainder of the loop transformation processing, a group of loop tables illustrated in FIGS. 16, 17 are created using the group of loop tables illustrated in FIG. 13, thereby generating a program illustrated in FIG. 18. First, at a step 402, the loop i is detected that is the first innermost loop.

In the processing hereinafter, toward an already processed distribution loop, NULL is set to a pointer pointing at the loop distribution range table (LDT). Thus, at a step 403, the loop is an unprocessed distribution loop, judging from the following condition: TRUE is set to a flag indicating a distribution loop and at the same time NULL is not set to the pointer pointing at the loop distribution range table. In the loop table 1330 for the loop i in FIG. 13, TRUE is set to 1335 and NULL is not set to 1337. Consequently, the loop i is an unprocessed distribution loop, and thus the answer to the step 403 proves to be Yes.

At a step 404, a loop table is created that is situated on the inner side of the loop table 1330 by one loop. FIG. 16 is a diagram for illustrating a manner in which, as the result of the step 404, a loop table 1600 (LT2) has been newly created on the inner side of the present loop table 1330 (LT1) by one loop.

Hereinafter, the explanation will be given concerning FIG. 16 in accordance with the step 404. First, since there exists only one unit of the loop distribution range table (LDT) 1360, there is no need of creating copies of the loop tables subsequent to LT1. Moreover, letting the name of a loop control variable for LT1 be i2, i2 is set to 1333. Then, 1:4, i.e., the range 1361 of the logical processor number in the loop distribution range table (LDT) 1360, is set to the loop range 1336 in LT1.

The loop table 1600 is a loop table corresponding to the loop situated on the inner side of the loop table 1330 by one loop. Accordingly, the pointer 1331 pointing at a head of the loop table situated on the inner side by one loop is set so that the pointer 1331 points at the loop table 1600. The setting to the following remains unchanged: The pointer 1332 pointing at the loop table situated on the outer side by one loop, the loop nest 1334, the distribution loop flag 1335, and the pointer 1338 pointing at the subsequent loop. Moreover, Null is set to the pointer 1337 pointing at the loop distribution range table 1360, thereby indicating that this loop table has been already processed.

Next, letting the name of a loop control variable for LT2 be i1, i1 is set to 1603. Then, 1:3, i.e., the loop distribution range 1362 in the loop distribution range table 1360, is set to the loop range 1606 in LT2. The loop table 1600 is the innermost loop table, and accordingly Null is set to a pointer 1601. A pointer 1602 pointing at the loop table situated on the outer side by one loop is set so that the pointer 1602 points at the loop table 1330. Also, fields 1604, 1605, 1607, and 1608 are initialized to 0, TRUE, NULL, and NULL, respectively. TRUE is set to 1605 and NULL is set to 1607, which indicates that the loop table 1600 has already been processed.

Next, since NULL is set to 1338, there exists no subsequent loop. Thus, the answer to a step 405 is No. The pointer 1332 points at the outer-side loop table 1310, nd thus the answer to a step 407 is TRUE (Yes). Thus, at a step 408, the processing is transferred to the outer-side loop table 1310, then getting back to the step 403. TRUE is set to 1315 but NULL is not set to 1317. Consequently, the loop table 1310 corresponds to an unprocessed distribution loop, and thus the answer to the step 403 is Yes.

From FIG. 15, the number of the loop distribution range tables of the loop table 1310 is equal to 3. Accordingly, at the step 404, a loop table (LT2) is created on the inner side of the loop table 1310 (LT1) by one loop. Then, two copies of the loop tables subsequent to LT1 are created, then being connected as the subsequent loops to LT1.

FIG. 17 illustrates a manner in which these loop tables have been created. A reference numeral 1700 denotes LT2. Reference numerals 1710, 1720, 1730 and 1740 denote the first copies of the loop tables subsequent to LT1, and reference numerals 1750, 1760, 1770 and 1780 denote the second copies of the loop tables subsequent to LT1. Hereinafter, the explanation will be given concerning FIG. 17 in accordance with the step 404.

First, letting the name of a loop control variable for LT1 and the copies thereof be j2, j2 is set to 1313, 1713 and 1753. Then, 1:1, 2:4 and 2:4, i.e., the ranges 1341, 1351 and 1501 of the logical processor numbers in the loop distribution range tables 1340, 1350 and 1500, are set to loop ranges 1316, 1716 and 1756 in LT1 and copies thereof. Moreover, the loop tables 1700, 1720 and 1760 are each loop tables corresponding to the loops situated on the inner side of the loop tables 1310, 1710 and 1750 by one loop. Accordingly, pointers 1311, 1711 and 1751 pointing at heads of the loop tables situated on the inner side by one loop are set so that the pointers 1311, 1711 and 1751 point at the loop tables 1700, 1720 and 1760, respectively. Also, the pointer 1312 pointing at the loop table situated on the outer side by one loop remains unchanged, and both of fields 1712, 1752 are initialized to NULL.

The loop nest 1314 remains unchanged, and fields 1714, 1754 are initialized to 0. These values will be set to values within the brackets at a loop nest determining step 409 later. The distribution loop flag 1315 remains unchanged, and TRUE is set to fields 1715, 1755. Moreover, Null is set to the pointer 1317 pointing at the loop distribution range table 1340 and to pointers 1717, 1757, thereby indicating that these loop tables have been preprocessed. Concerning pointers pointing at the subsequent loop tables, the setting is executed as follows: The pointer 1318, which had pointed at 1320 previously, is set so that 1318 points at 1710. A pointer 1718 is set so that 1718 points at 1750. A pointer 1758 is set so that 1758 points at 1320.

Next, letting the name of a loop control variable for LT2 and the copies thereof be j1, j1 is set to 1703, 1723 and 1763. Then, 2:3, 1:1 and 2:3, i.e., the loop distribution ranges 1342, 1352 and 1502 in the loop distribution range tables 1340, 1350 and 1500 are set to loop ranges 1706, 1726 and 1766 in LT2 and the copies thereof.

The loop tables 1330, 1730 and 1770 are each loop tables corresponding to the loops situated on the inner side of the loop tables 1700, 1720 and 1760 by one loop. Consequently, pointers 1701, 1721 and 1761 pointing at heads of the loop tables situated on the inner side by one loop are set so that the pointers 1701, 1721 and 1761 point at the loop tables 1330, 1730 and 1770, respectively. The loop tables 1310, 1710 and 1750 are each loop tables corresponding to the loops situated on the outer side of the loop tables 1700, 1720 and 1760 by one loop. Consequently, pointers 1702, 1722 and 1762 pointing at heads of the loop tables situated on the outer side by one loop are set so that the pointers 1702, 1722 and 1762 point at the loop tables 1310, 1710 and 1750, respectively. Moreover, loop nests 1704, 1724 and 1764 are initialized to 0. These values will be set to values within the brackets at the loop nest determining step 409 later. Furthermore, TRUE is set to distribution loop flags 1705, 1725 and 1765. Also, Null is set to pointers 1707, 1727 and 1767 pointing at the loop distribution range tables, thereby indicating that these loop tables have been preprocessed. Regarding pointers pointing at the subsequent loop tables, the pointers 1708, 1728 and 1768 are initialized to NULL.

The loop tables 1730, 1770 and 1740, 1780 are the copies of the loop tables 1330 and 1600, respectively, and the same values are set to all the fields except for pointers pointing at the outer-side loop tables and the inner-side loop tables and loop nests. Namely, 1733, 1773 possess the same value as 1333, and 1735 to 1738, 1775 to 1778 possess the same values as 1335 to 1338. Also, 1743, 1783 possess the same value as 1603, and 1745 to 1748, 1785 to 1788 possess the same values as 1605 to 1608. The loop nests, i.e., 1734, 1774, 1744, 1784, are initialized to 0. Regarding the pointers pointing at the loop tables situated on the inner side by one loop, the setting is executed as follows: 1731 points at 1740, NULL is set to 1741, 1771 points at 1780, and NULL is set to 1781. Regarding the pointers pointing at the loop tables situated on the outer side by one loop, the setting is executed as follows: 1732 points at 1720, 1742 points at 1730, 1772 points at 1760, and 1782 points at 1770.

Next, although the original subsequent loop table to the loop table 1310 is 1320, the answer to the step 405 proves to be No, because, in the present embodiment, the explanation will not be given concerning the processing about the tables subsequent to 1320.

From 1312, there exists the loop table 1300 that is situated on the outer side of the loop table 1310, and accordingly the answer to the step 407 proves to be Yes. Thus, at the step 408, the processing is transferred to the loop table 1300, then getting back to the step 403.

Since FALSE is set to 1305, the loop k corresponding to the loop table 1300 is no distribution loop. Thus, the answer to the step 403 is No. Since NULL is set to 1308, there exists no subsequent loop. Thus, the answer to the step 405 is No. Since NULL is set to 1302, there exists no outer-side loop. Thus, the answer to the step 407 is No.

Next, at the loop nest determining step 409, the nests in the loop tables in FIG. 17 are determined. This processing is a simple processing in which, starting from the outermost loop, the nests are determined in sequence. Accordingly, the detail will be omitted.

In FIG. 17, the loop nests thus determined are the values in 1304, 1314, and the values within brackets in 1704, 1334, 1604, 1714, 1724, 1734, 1744, 1754, 1764, 1774 and 1784.

Next, at a loop multiplexing/loop peeling step 410, in accordance with the group of the loop tables in FIG. 17, loop multiplexing and the loop peeling are applied to the original intermediate language representing the loops.

FIG. 18 illustrates a program obtained as the result of applying the loop multiplexing and the loop peeling to the original loop intermediate language, i.e., the portion from the statement 803 to the statement 817 in FIG. 8. A statement 1810 to a statement 1835 is a portion corresponding to the statement 805 to the statement 809 in FIG. 8. Of them, the statement 1810 to the statement 1815 correspond to the loop tables 1310, 1700, 1330 and 1600, and the statement 1820 to the statement 1825 correspond to the loop tables 1710, 1720, 1730 and 1740, and the statement 1830 to the statement 1835 correspond to the loop tables 1750, 1760, 1770 and 1780. Similarly, a statement 1840 to a statement 1880 is a portion corresponding to the statement 811 to the statement 815 in FIG. 8.

Now, getting back to FIG. 4, there exists no subsequent loop nest last, and accordingly the answer to a step 411 proves to be No. Consequently, the processing by the loop transforming unit 1071 is finished here.

Figure 6:
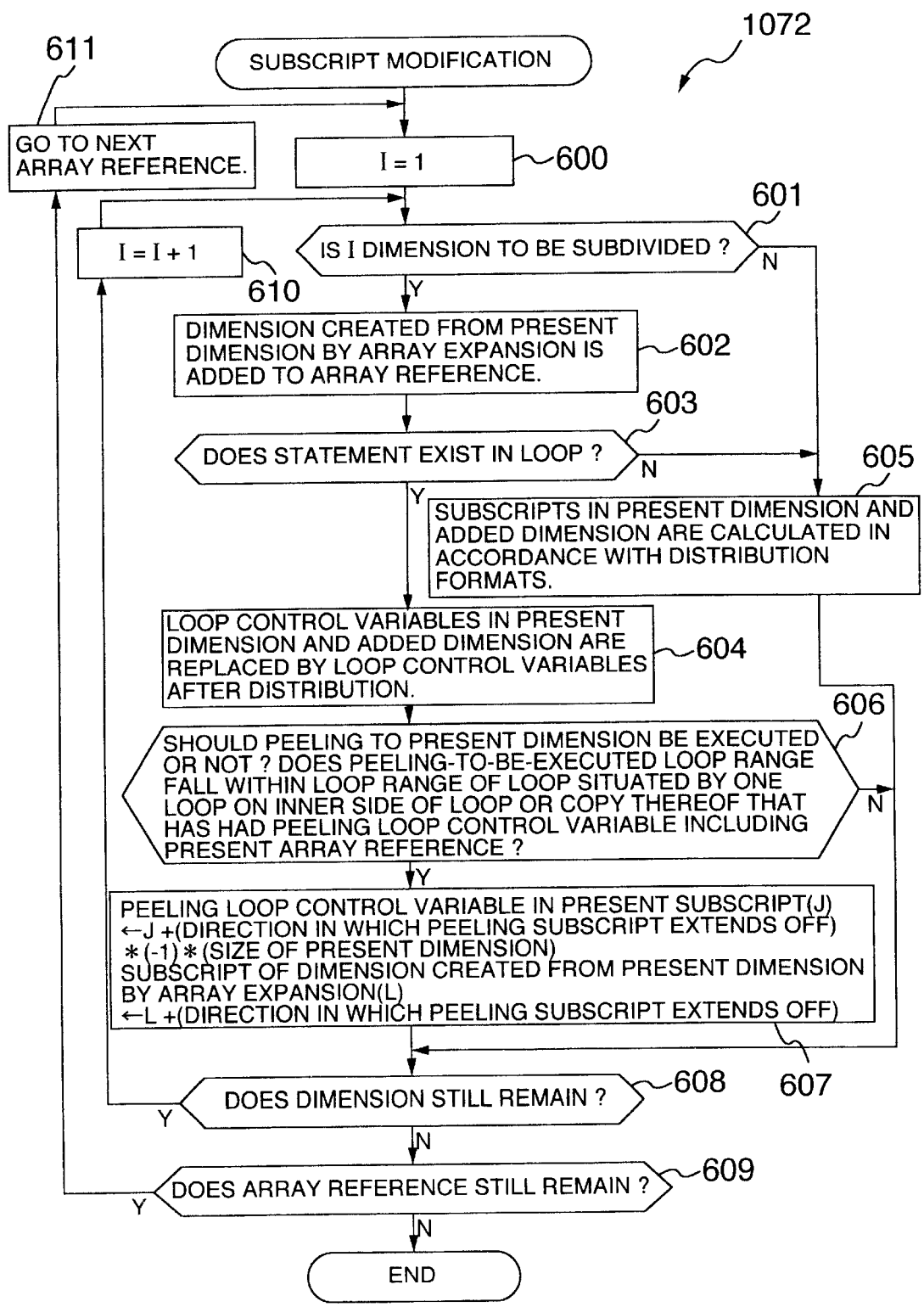
FIG. 6 is a flow chart for explaining a processing by an subscript modifying unit.

Next, the processing by the subscript modifying unit 1072 in FIG. 1 is executed. FIG. 6 is a diagram for illustrating processing steps by the subscript modifying unit 1072.

Here, the explanation will be given concerning the processing for an array reference a (i, j−1) in the statements 1814, 1824, using FIG. 14 illustrating the array reference table for the array reference and FIG. 19 illustrating a program obtained as the result of the processing.

First, at a step 600 in FIG. 6, a value of I becomes equal to 1 and the processing for the 1st dimension is performed. Since TRUE has been set to the subdividing flag 1101 in the 1st dimension in the subdivided information table 1100, the 1st dimension should be subdivided. Thus, the answer to a step 601 proves to be Yes.

The value 3 has been set to the expanding correspondence dimension 1212 for the 1st dimension of the expanded dictionary 1200. Consequently, at a step 602, the 3rd dimension is added to the array reference. Also, the statement 1814 exists within the loop, and thus the answer to a step 603 is Yes.

From a field 1412, a subscript in the 1st dimension of the present array reference table 1400 is i. Moreover, from the pointer 1436, the loop table having the loop control variable i is 1330. Accordingly, at a step 604, the subscript in the 1st dimension is replaced by i1 in 1603, i.e., the loop control variable of the inner-side loop the value of which is increased first, and a subscript in the 3rd dimension is replaced by i2 in 1333, i.e., the loop control variable of the outer-side loop. In addition, FALSE has been set to a peeling flag 1432 for the 1st dimension of the present array reference, and thus the answer to a step 606 is No. Also, the array a is, originally, 2-dimensional, and thus the answer to a step 608 is Yes. Thus, at a step 610, the value of I is made equal to 2 and the processing is transferred to the 2nd dimension, then getting back to the step 601.

Since TRUE has been set to the subdividing flag 1105 in the 2nd dimension in the subdivided information table 1100, the 2nd dimension should be subdivided. Thus, the answer to the step 601 proves to be Yes. Moreover, a value 4 has been set to the expanding correspondence dimension 1215 for the 2nd dimension of the expanded dictionary 1210. Consequently, at the step 602, the 4th dimension is added to the array reference. Also, the statement 1814 exists within the loop, and thus the answer to the step 603 is Yes.

From a field 1422, a subscript in the 2nd dimension of the present array reference table 1400 is j−1. Moreover, from the pointer 1446, the loop table having the loop control variable j is 1310. Accordingly, at the step 604, the subscript in the 2nd dimension is replaced by j1−1 with the use of j1 in 1703, i.e., the loop control variable of the inner-side loop the value of which is increased first, and a subscript in the 4th dimension is replaced by j2 in 1313, i.e., the loop control variable of the outer-side loop.

Although TRUE has been set to a peeling flag 1442 for the 2nd dimension of the present array reference, a field 1444 shows that 1:1 has been set to a loop range of the present array reference that is to undergo the peeling. Meanwhile, 2:3 has been set to a loop range 1706 of a loop situated on the inner side of the loop table 1310 by one loop, the loop table 1310 including the present array reference and being a loop table of the loop that has originally had the peeling group control variable j. Consequently, the loop range 1:1 is not included in the loop range 2:3, and thus the answer to the step 606 is No. This indicates the following: Although the loop range 1:1 is a range that necessitates a specific processing for the subscript modifying toward j in association with the loop peeling, the present loop range does not include the loop range 1:1 and accordingly the specific processing is unnecessary.

There exists no subsequent dimension in the array a, and thus the answer to the step 608 is No. The processing steps described until now have modified the array reference a (i, j−1) in the statement 1814 to an array reference a (i1, j1−1, i2, j2) in a statement 1915. There still remains the other array references, and thus the answer to a step 609 proves to be Yes. Thus, at a step 611, the processing is transferred to the next array reference, i.e., a (i, j−1) in the statement 1824.

Toward this array reference, the processing for the 1st dimension is the same as that in the case of the statement 1814. Accordingly, the explanation therefor will be omitted, and thus the explanation will be given concerning only the case of the 2nd dimension. The processings at the steps 601, 602, 603 and 604 are the same as those in the case of the array reference in the statement 1814. As the result, a (i, j−1) in the statement 1824 is once modified to the form of the array reference a (i1, j1−1, i2, j2) in the statement 1915.

Next, TRUE has been set to the peeling flag 1442, and the field 1444 shows that 1:1 has been set to a loop range of the present array reference that is to undergo the peeling. Meanwhile, a loop table that becomes the copy of the loop table 1310 is the loop table 1710, and 1:1 has been set to a loop range 1726 of a loop situated on the inner side of the loop table 1710 by one loop, the loop table 1310 including the present array reference and being the loop table of the loop that has originally had the peeling group control variable j. Consequently, both of the loop ranges coincide with each other, and thus the answer to the step 606 turns out to be Yes.

From a field 1445, a direction in which the peeling subscript extends off is −1, and from a field 1216, a size of the present dimension is 3. Thus, j1 becomes j1+3, and j2 becomes j2−1. From these relations, j1−1 becomes j1+2, and j2 becomes j2−1, thereby obtaining an array reference a (i1, j1+2, i2, j2−1) in a statement 1925.

Next, the array a is the 2-dimensional array, and thus the answer to the step 608 turns out to be No. In the present embodiment, the explanation has been and will be given regarding only the two array references. Accordingly, the answer to the step 609 proves to be No, and thus the processing by the subscript modifying unit 1072 is finished here.

The other array references are also processed in much the same way, thereby making it possible to obtain the intermediate language in FIG. 19. Up until now, the processing by the program transforming unit 107 is completed.

Figure 7:
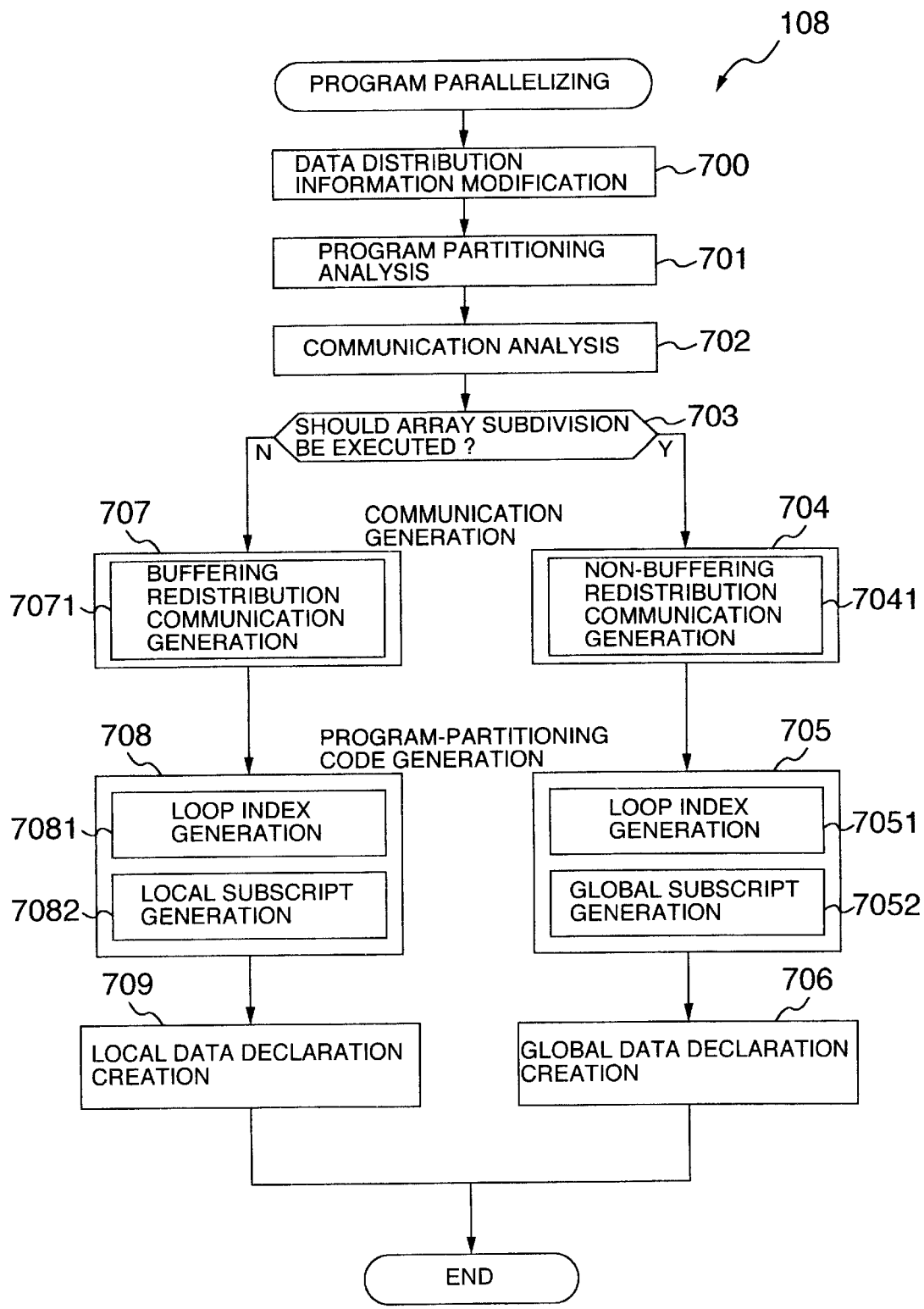
FIG. 7 is a flow chart for explaining a processing by a program parallelizing unit.

Next, the explanation will be given concerning the processing by the program parallelizing unit 108. FIG. 7 is a diagram for illustrating processing steps by the program parallelizing unit 108.

Figure 20:
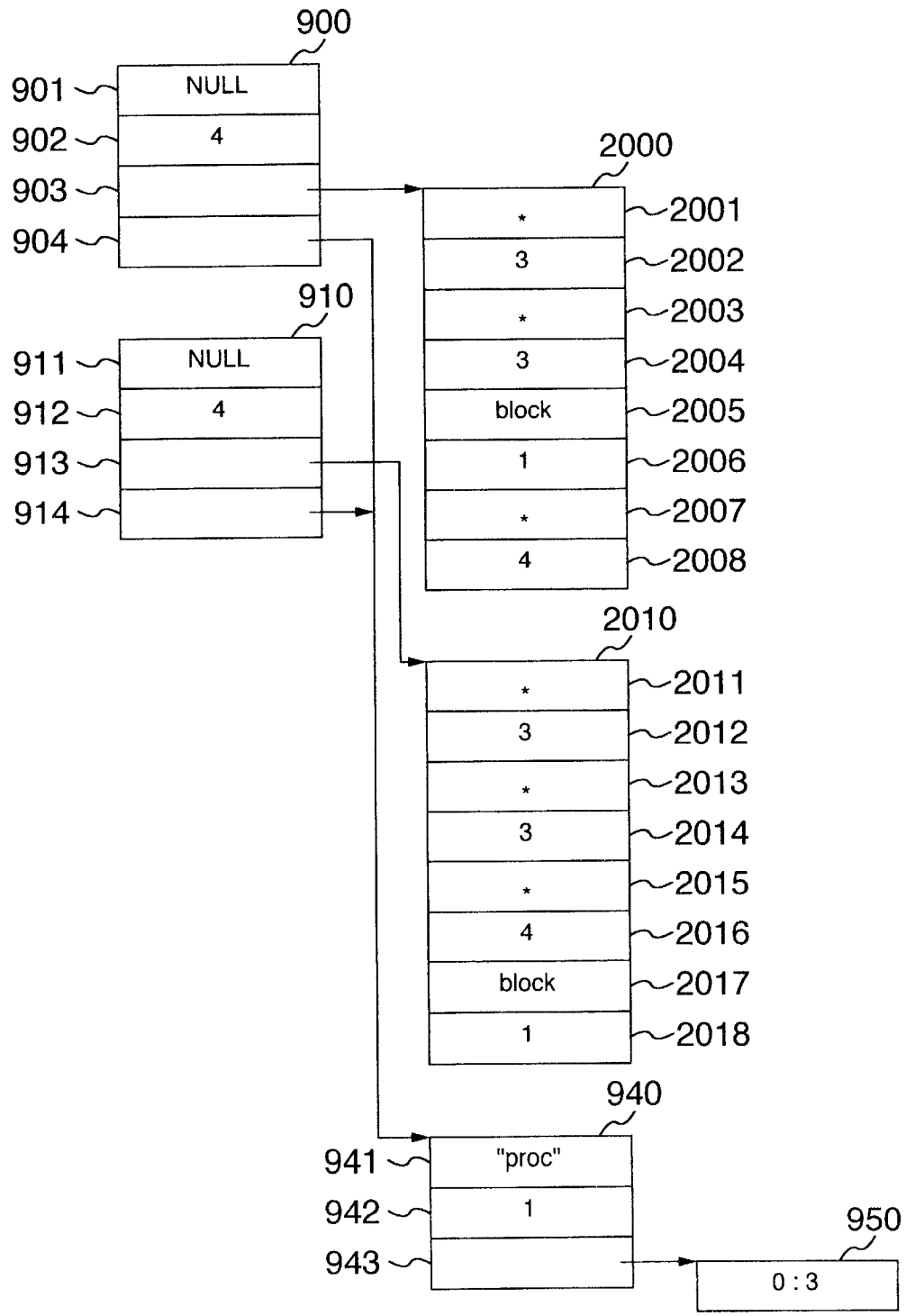
FIG. 20 is a diagram for explaining data distribution information after modifying the data distribution information.

At a data distribution information modifying step 700, the data distribution information 140 and the expanded dictionary 1200 are inputted and the data distribution information modified is outputted. FIG. 20 illustrates the data distribution information after being modified. The brief explanation will be given below concerning the processing of modifying the data distribution information since the processing is simple and easy.

As is indicated in 1201, the processing by the array expanding unit 106 has made the number of the array dimensions equal to 4. Accordingly, the value 2 in 902, 912 in FIG. 9 is modified to the value 4 in 902, 912 in FIG. 20. Accompanying this modification, tables by the amount of the 4 dimensions are ensured in 2000, 2010. Next, a data distribution format of a dimension, the value a, of the flag of which is set to "changed" in the expanded dictionary and to which the data distribution is specified, is modified to "*" if the dimension corresponds to the per-dimension distribution information table. Moreover, a data distribution format of a dimension, which corresponds to the above-described dimension and the value of the flag of which is set to "new", is set to the original data distribution format of the above-described dimension having the "changed" flag. Incidentally, width of the block-partitioning is recalculated. The format "*" is set to the other dimensions.

First, the processing is performed regarding the data distribution information table 900 in FIG. 9.

The value of the flag 1211 is "changed" in the 1st dimension of the expanded dictionary, and the data distribution format 921 of the 1st dimension corresponding to the data distribution information table 900 is block. Consequently, the data distribution format of this dimension is modified to "*". Thus, the format "*" is set to 2001, and 3, i.e., the size of the 1st dimension of the expanded dictionary, is set to 2002 from 1213. Moreover, a dimension corresponding to the above-described 1st dimension is the 3rd dimension from 1212, and the value of the flag 1217 of the 3rd dimension is "new". Accordingly, this dimension is modified so that it is data-distributed. Thus, block is set to 2005. The width of the block-partitioning becomes equal to 1, i.e., a value obtained by dividing 4, i.e., the size indicated by the upper and lower limit values 1219 in the dimension, by 4, i.e., the number of the logical processors indicated by 950. Accordingly, the value 1 is set to 2006.

Meanwhile, although the value of the flag 1214 is "changed" in the 2nd dimension, the data distribution format 923 of the 2nd dimension corresponding to the data distribution information table 900 is "*". Consequently, the data distribution format of this dimension is set to "*". Thus, the format "*" is set to 2003, and 3, i.e., the size of the 2nd dimension of the expanded dictionary, is set to 2004 from 1216.

Also, a dimension corresponding to the above-described 2nd dimension is the 4th dimension from 1215. Accordingly, the data distribution format of the 4th dimension is also set to "*". Thus, the format "*" is set to 2007, and 4, i.e., the size of the 4th dimension of the expanded dictionary, is set to 2008 from 1222.

Next, the processing is performed regarding the data distribution information table 910 in FIG. 9.

The value of the flag 1211 is "changed" in the 1st dimension of the expanded dictionary, but the data distribution format 931 of the 1st dimension corresponding to the data distribution information table 910 is "*". Consequently, this dimension is set so that it is not data-distributed. Thus, the format "*" is set to 2011, and 3, i.e., the size of the 1st dimension of the expanded dictionary, is set to 2012 from 1213. Also, a dimension corresponding to the above-described 1st dimension is the 3rd dimension from 1212. Accordingly, the 3rd dimension is set so that it is not data-distributed, either. Thus, the format "*" is set to 2015, and 4, i.e., the size of the 3rd dimension of the expanded dictionary, is set to 2016 from 1219.

Meanwhile, the value of the flag 1210 is "changed" in the 2nd dimension of the expanded dictionary, and the data distribution format 933 of the 2nd dimension corresponding to the data distribution information table 910 is block. Consequently, this dimension is modified so that it is not data-distributed. Thus, the format "*" is set to 2013, and 3, i.e., the size of the 2nd dimension of the expanded dictionary, is set to 2014 from 1216. Moreover, a dimension corresponding to the above-described 2nd dimension is the 4th dimension from 1215, and the value of the flag 1220 of the 4th dimension is "new". Accordingly, this dimension is modified so that it is data-distributed. Thus, block is set to 2017. The width of the block-partitioning becomes equal to 1, i.e., a value obtained by dividing 4, i.e., the size indicated by the upper and lower limit values 1222 in the dimension, by 4, i.e., the number of the logical processors indicated by 950. Accordingly, the value 1 is set to 2018.

Next, based on the data distribution information in FIG. 20, a program-partitioning analyzing step 701 and a communication analyzing step 702 are executed. The processing methods therefor are described in Seema Hiranandani, Ken Kennedy, Chau-Wen Tseng, "Compiling Fortran D for MIMD Distributed-Memory Machines", Communications of the ACM, Vol. 35, No. 8, August, 1992, pp. 66–80. Also, a communication generating step 707, a program-partitioning code generating step 708 and a partitioned data declaration creating step 709 are described in this literature.

FIG. 21 is a diagram for illustrating a program obtained as the result of the processing by the program parallelizing. Hereinafter, the brief explanation will be given concerning the processing steps, using FIGS. 10, 20 and 21.

Since TRUE has been set to the subdividing flag 1005, the array a should be subdivided. Thus, the answer to a step 703 proves to be Yes. At a communication generating step 704, generation of a normal send/receive type inter-logical processor communication is generated. in the redistribution processing, a redistribution communication without buffering is generated by a non-buffering redistribution communication generation at a step 7041. This process corresponds to statements 2102, 2140 in FIG. 21.

A redistribution routine "non_buf_remap" in the statement 2102 is a routine that, without using buffers, data-redistributes the array a from a data distribution format described in a descriptor D1 to a data distribution format described in a descriptor D2.

A reference notation D1 in the statement 2102 denotes the descriptor that describes a data distribution format of the array a at this point in time. In the first iteration of the loop k, the descriptor corresponds to a data distribution in a head of the program. From the fact that, originally, the statement 802 and the statement 804 represent the same data distribution, it turns out that the descriptor corresponds to a data distribution that corresponds to the data distribution in the statement 804 and that data distribution information tables 900, 2000 in FIG. 20 indicate. Also, in the second iteration of the loop k or in the iterations thereafter, it turns out that the descriptor corresponds to a data distribution that corresponds to the data distribution in the statement 810 and that tables 910, 2010 in FIG. 20 indicate.

A reference notation D2 in the statement 2102 denotes the descriptor that describes a data distribution format of the array a after being data-redistributed by the redistribution routine "non_buf_remap". The descriptor corresponds to data distribution information that the tables 900, 2000 in FIG. 20 indicate. A redistribution routine "non_buf_remap" in the statement 2140 is a routine that, without using buffers, data-redistributes the array a from a data distribution format described in a descriptor D2 to a data distribution format described in a descriptor D1.

A reference notation D2 in the statement 2140 denotes the descriptor that describes a data distribution format of the array a at this point in time. The descriptor corresponds to data distribution information that the tables 900, 2000 in FIG. 20 indicate. A reference notation D1 in the statement 2140 denotes the descriptor that describes a data distribution format of the array a at this point in time. The descriptor corresponds to data distribution information that the tables 910, 2010 in FIG. 20 indicate.

At a program-partitioning code generating step 705, the processings by a loop subscript generating step 7051 and a global subscript generating step 7052 are executed.

At the loop subscript generating step 7051, by distributing a loop range of a loop corresponding to a loop control variable included in a subscript in an array dimension to be data-distributed, upper and lower limit values of the loop after being distributed are generated.

In an array after the processing by the array expanding unit 106 in the present embodiment has been applied thereto, on account of the data distribution information modifying step 700, the dimension to be data-distributed is a expanding correspondence dimension of the original data-distributed dimension. Moreover, size of the dimension is equal to the number of the logical processors as the result of the processing by the array expanding unit 106. Also, on account of the loop transforming unit 1071, a loop length of a loop having a loop control variable appearing in the above-described dimension to be data-distributed is equal to the range of the logical processor numbers in the loop distribution range table. When the intermediate language corresponding to FIG. 8 is inputted, the loop length is equal to the number of the logical processors and accordingly the loop is eliminated.

At the global subscript generating step 7052, as the subscript in the dimension that has been data-distributed, a subscript that indicates a corresponding array element before the data distribution is used. In the present embodiment, the subscript in the array dimension to be data-distributed had been equal to any one of the logical processor numbers before the data distribution. Thus, the subscript after the data distribution is also made equal to the same logical processor number.

Data distribution in statements 1919 to 1936 is the data distribution that the data distribution information tables 900, 2000 have indicated, and the 3rd dimension of the array a is block-partitioned. A loop control variable existing in the 3rd dimension of the array a is i2 in array references in statements 1914, 1915, 1924, 1925, 1934 and 1935. Consequently, the loop i2 is eliminated and the subscript in the 3rd dimension of the array a becomes the logical processor number.

A subscript "mype" in the 3rd dimension of the array a in statements 2113, 2114, 2123, 2124, 2133 and 2134 in FIG. 21 represents the logical processor number. From this, the loop i2 does not exist in statements 2110 to 2135 in FIG. 21.

Similarly, data distribution in statements 1940 to 1980 is the data distribution that the data distribution information tables 910, 2010 have indicated, and the 4th dimension of the array a is block-partitioned. A loop control variable existing in the 4th dimension of the array a is j2 in array references in statements 1952, 1953, 1962, 1963, 1972 and 1973. Consequently, the loop j2 is eliminated and the subscript in the 4th dimension of the array a becomes the logical processor number.

A subscript "mype" in the 4th dimension of the array a in statements 2152, 2153, 2162, 2163, 2172 and 2173 in FIG. 21 represents the logical processor number. From this, the loop j2 does not exist in statements 2141 to 2180 in FIG. 21.

Next, at a global data declaration creating step 706, toward the data-distributed array as well, after the array has been expanded, an array declaration before the data distribution is performed. A declaration in a statement 2100 corresponds thereto.

Finally, the code generating unit 109 inputs the intermediate language corresponding to FIG. 21, then outputting a source program in FIG. 21 or the parallelized program 160. Here, the parallelized program 160 is obtained by transforming the source program into the form of an object program. Up until now, the explanation of the processing flow by the first embodiment is finished.

(2) Second Embodiment

Figure 33:
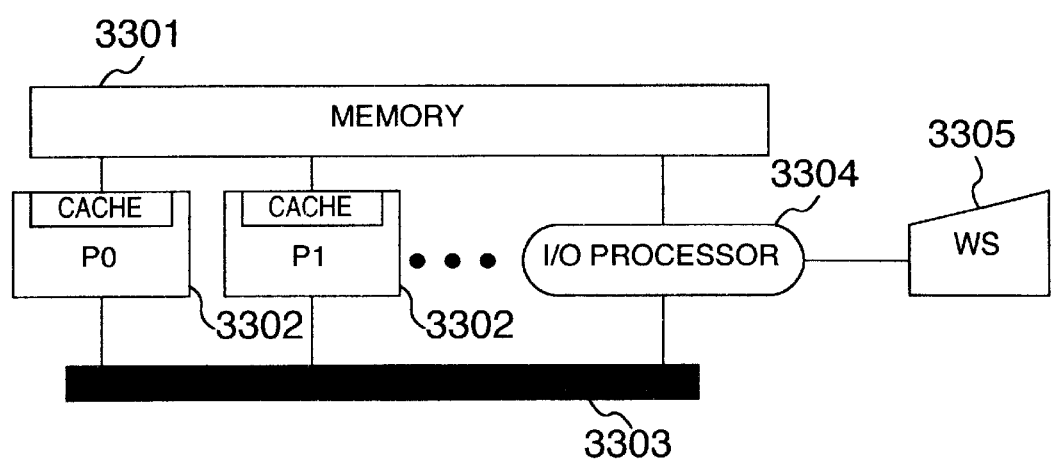
FIG. 33 shows an example of a multi processor system that is an object of the compiler in the second embodiment.

FIG. 33 illustrates a configuration example of a multi processor system having a shared-memory. In the same figure, the reference numerals each denotes the following components: 3301 the shared-memory, 3302 logical processor elements, 3303 a control network, 3304 an input/output logical processor element, and 3305 an input/output console or workstation. Each of the logical processors 3302 has a cache, and all of the accesses to the shared-memory 3301 are performed through the cache in each of the logical processors 3302.

A compiler according to the present embodiment is executed in the input/output console or workstation 3305, then being transformed to a parallel source program or a parallel object program. The parallel source program in the former is further transformed to the parallel object program by a compiler for the logical processor elements 3302. The parallel object program is transformed to load modules by linker, and the load modules are loaded into the shared-memory 3301 through the input/output logical processor element 3304, then being executed by the respective logical processor elements 3302. Moreover, controls of the respective logical processor elements 3302 such as the starting-up or the termination are carried out through the control network 3303.

FIG. 28 is a diagram for illustrating a source program 2710 that carries out the matrix computation. The source program 2710 is a source program obtained by removing, from the source program presented in FIG. 8, the processor directive 801, the data distribution directive 802 and the data redistribution directives 804, 810. The number of the logical processors is not specified in the source program 2710. It is assumed, however, that the number of the logical processors is specified as 4 at a compile option.

FIG. 30 shows an example of a parallelized program parallelized by the conventional technique. In statements 3003, 3020, barrier synchronizations are called up instead of redistribution routines that are called up in statements 2302, 2320 in the parallelized program in FIG. 23. Also, a routine "fork" is called up in a statement 3001 and a routine "join" is called up in a statement 3042.

Other than these, the points that differ from the program in FIG. 23 are the following two: In FIG. 23, since the array data is distributed into the distributed-memories, only a portion of the array data has been allocated to one processor. On account of this, the declaration of the array a in FIG. 23 has turned out to be a (3, 12). The parallelized program in FIG. 30, however, is a program prepared for the shared-memory type multi processor system. Accordingly, the array a is not distributed and thus the declaration is a (12, 12).

Also, for the same reason as the above-described, as indicated by statements 2311, 2330 in FIG. 23, iteration ranges of the loops have been reduced so that the respective processors make reference to the elements of the distributed array. On the other hand, in statements 3011, 3030 in FIG. 30, using variables "mype" storing the logical processor numbers therein and in order that the respective processors make reference to only a portion of the array that will not be distributed, loop ranges are generated that allow the respective processors to make reference to only the array elements that the respective processors should take charge of.

FIG. 31 is a diagram in which computation assignment portions to the logical processors by the conventional parallelizing are illustrated, paying a special attention to a computation assignment portion to a logical processor (P1) in the 1st loop nest and a computation assignment portion to a logical processor (P2) in the 2nd loop nest. A reference numeral 3100 denotes the whole of a 12 by 12 array a.

The cache in each of the plurality of logical processors includes a plurality of cache lines having a fixed length (i.e., cache line length). A plurality of data having consecutive addresses on the shared-memory is stored in a single cache line. There exists a limitation on the hardware toward the data addresses on the shared-memory that are stored in each cache line. Also, in the present embodiment, it is assumed that each cache line stores a data unit including 2-data that starts from an array element indicated by an odd number in FIG. 31.

In the 1st loop nest, a processor P0 calculates a portion 3101 and the processor P1 calculates the portion 3102. However, since there exists the above-described limitation between each processor and the shared-memory, it turns out that the cache in P0 and that in P1 share 12 data units surrounded by a notation 0 within a crosshatched portion 3103. Also, in general, the larger the number of such data sharing cache lines becomes, the more likely it is that the between-cache conflict (i.e., false sharing) will occur.

A rectangular portion 3111 the addresses of the four corners of which are 73, 84, 97 and 108 is the computation assignment portion to P2 in the 2nd loop nest. The rectangular portion 3111 is a single consecutive region starting from the address of the odd number and ending at the address of the even number. Consequently, it shares no data with the caches in the other processors, and thus the false sharing occurs only in the 1st loop nest.

FIG. 32 is a diagram in which computation assignment portions to the logical processors by the parallelizing in the present embodiment are illustrated, paying a special attention to a computation assignment portion to the logical processor (P1) in the 1st loop nest and a computation assignment portion to the logical processor (P2) in the 2nd loop nest.

A reference numeral 3200 denotes the whole of the 12 by 12 array a. Numerals in the array 3200 illustrate a manner in which addresses of the array elements are located. Sequence of addresses of the first 36 (i.e., the 1st to the 36th) array elements is illustrated in a portion with 12 rows and 3 columns that starts from the upper-left corner of the array. From the sequence of the addresses, the portions, each of which has 3 rows and 3 columns and is surrounded by heavy lines, have consecutive addresses. This situation is also the same concerning the other portions where no numeral has been indicated.

In the 1st loop nest, a portion 3201 is a computation assignment portion that P0 calculates and a portion 3202 is the computation assignment portion that P1 calculates. The four crosshatched portions, the addresses of which are 9 and 10, 45 and 46, 81 and 82, 117 and 118, respectively, indicate 4 data units that the cache in P1 and that in P0 share. In comparison with the case in FIG. 31, the number of the data sharing cache lines has decreased down to ⅓rd. This makes the false sharing less likely to occur to this degree.

A rectangular portion 3211 the addresses of the four corners of which are 73, 79, 102 and 108 is the computation assignment portion to P2 in the 2nd loop nest. The rectangular portion 3211 is a single consecutive region starting from the address of the odd number and ending at the address of the even number. Consequently, it shares no data with the caches in the other processors, and thus the false sharing occurs only in the 1st loop nest.

In general, in the conventional technique, there exists a possibility of sharing the data units by the size of the 2nd dimension of the array a in FIG. 31. Meanwhile, in the present invention, there exists a possibility of sharing the data units by the number of the processors, i.e., only 1 for the portion surrounded by the heavy lines in FIG. 32. Accordingly, if the size of the 2nd dimension exceeds the number of the processors, the method according to the present embodiment makes the false sharing less likely to occur than the conventional method does. Also, even if the cache line length is increased, this tendency remains unchanged.

Figure 27:
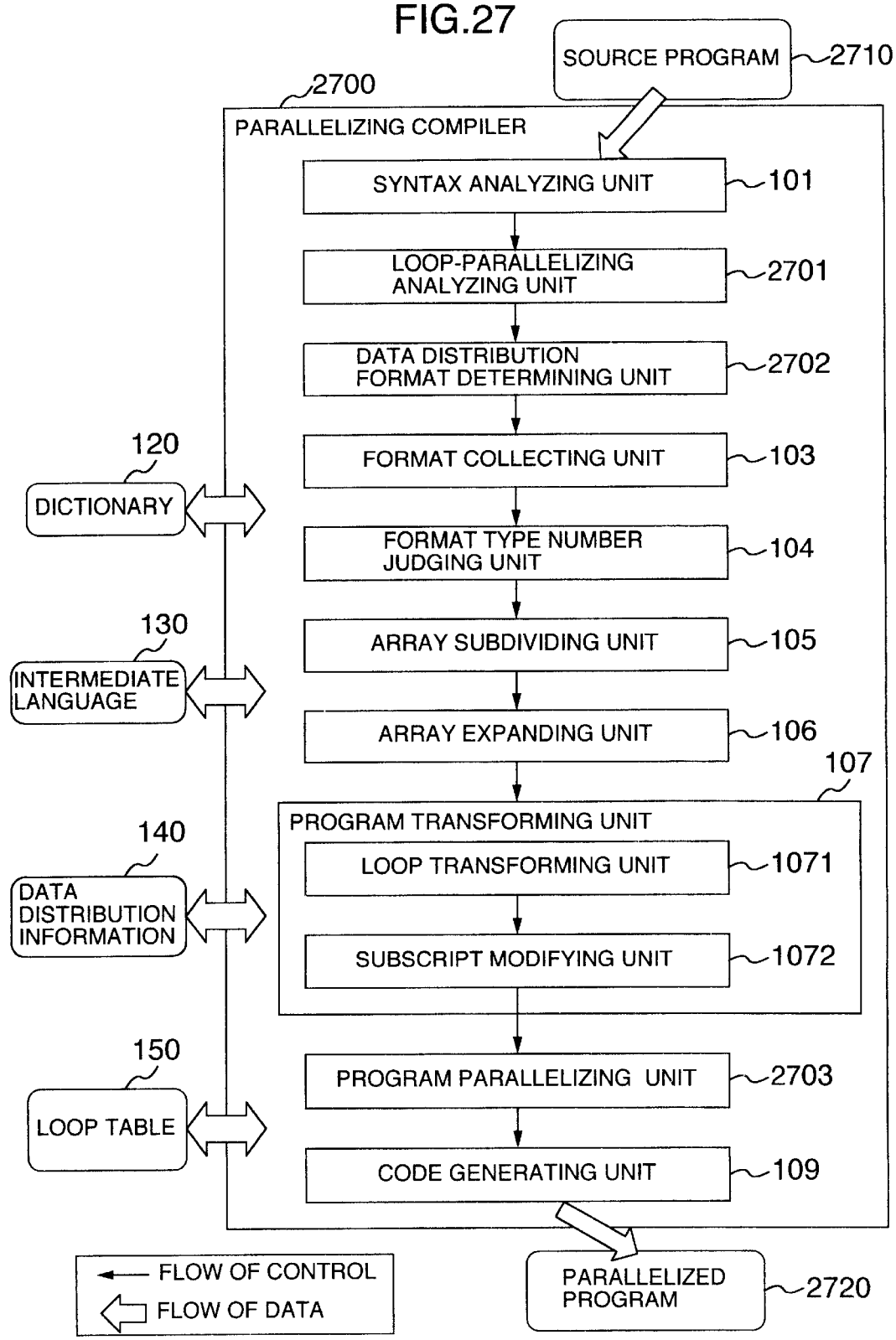
FIG. 27 is a configuration diagram of a parallelizing compiler according to the second embodiment of the present invention.

FIG. 27 illustrates the format of a parallelizing compiler according to the present embodiment. A reference numeral 2700 denotes the parallelizing compiler. In the parallelizing compiler 2700, the components other than the following are the same as those in FIG. 1: A loop-parallelizing analyzing unit 2701, a data distribution format determining unit 2702 and a program parallelizing unit 2703. Accordingly, the explanation of the same components will be omitted, and thus the explanation will be given below concerning only the loop-parallelizing analyzing unit 2701, the data distribution format determining unit 2702 and the program parallelizing unit 2703.

The loop-parallelizing analyzing unit 2701 inputs the dictionary 120 and the intermediate language 130 so as to analyze the parallelization of a loop, then outputting the loop table 150. The details of this processing has been explained in Hans Zima and Barbara Chapman. "Supercompilers for Parallel and Vector Computers", Addison-Wesley, 1991.

The data distribution format determining unit 2702 inputs the dictionary 120, the intermediate language 130 and the loop table 150, then outputting the data distribution information 140.

Here, at first, a problem is examined about in what dimension of the array the loop control variable of each of the parallelized loops will appear. Next, in correspondence with the method of assigning a loop iteration by the loop parallelizing to the processors, a problem is examined about by what data distribution method the array elements will be allocated to the processors. The answer to this can be obtained by substituting, into array subscripts on the left side of a substitution statement existing in the loop, the loop iteration range after the parallelizing that will be assigned to the respective processors.

For example, it is assumed that the 1st to the 10th iterations, the 11th to the 20th iterations, the 21st to the 30th iterations and the 31st to the 40th iterations of the loop iteration of the loop i are assigned to the processors proc (0), proc (1), proc (2) and proc (3), respectively, and that, in the loop, an array a the number of the elements of which is 40 has appeared on the left side of the substitution statement in the form of "a(i)=". Then, the processors proc (0), proc (1), proc (2) and proc (3) update values of a (1) to a (10), a (11) to a (20), a (21) to a (30) and a (31) to a (40), respectively. Namely, the method of parallelizing the loop has turned out to be the same as that at the time when the array is allocated to the respective processors by the block distribution. Concerning the remaining processing, using the data distribution information table 140 obtained by the above-described method, the same method as that in the above-described first embodiment is applied, thereby obtaining a parallelized program 2720.

The loop-parallelizing analyzing unit 2701 analyzes the source program 2710, thereby determining that the loop i is parallelized for statements 2802 to 2806, i.e., the 1st loop nest, and that the loop j is parallelized for statements 2807 to 2811, i.e., the 2nd loop nest.

The data distribution format determining unit 2702 inputs the loop table 150 that the loop-parallelizing analyzing unit 2701 has outputted, the dictionary 120 and the intermediate language 130, then performing the following processings: The number of the logical processors has been specified as 4 at the above-described compile option. Accordingly, first, in the loop i in the 1st loop nest, the 1st to the 3rd iterations, the 4th to the 6th iterations, the 7th to the 9th iterations and the 10th to the 12th iterations of the loop iteration are assigned to the processors proc (0), proc (1), proc (2) and proc (3), respectively. This assigning method is the same as the block distribution in the data distribution.

Also, in the loop i, an array a, the number of the elements in the 1st dimension of which is 12, has appeared on the left side of a substitution statement in the form of "a(i, j)=". Consequently, the processors proc (0), proc (1), proc (2) and proc (3) update values of a (i, j) to a (3, j), a (4, j) to a (6, j), a (7, j) to a (9, j) and a (10, j) to a (12, j), respectively. Namely, the 1st dimension of the array a is block-distributed. Similarly, in the loop j in the 2nd loop nest, the loop iteration is block-distributed. Since, in the loop j, the array a the number of the elements in the 2nd dimension of which is 12 has appeared on the left side of a substitution statement in the form of "a(i, j)=", the 2nd dimension of the array a is block-distributed. Accordingly, toward the data distribution information 140, the information is set that the 1st dimension of the array a is block-distributed in the 1st loop nest and the 2nd dimension of the array a is block-distributed in the 2nd loop nest. As a result, the data distribution information in FIG. 9 is obtained.

The processings from the format collecting unit 103 to the program transforming unit 107 are the same as those in the above-described first embodiment. The processing by the program parallelizing unit 2703 is substantially the same as that by the program parallelizing unit 108 in the first embodiment except the following: Routines "barrier" that induce the barrier synchronization are called up instead of the routines "remap" and the send/receive communication at the communication generating step 704 (refer to FIG. 7). Moreover, in order to parallelize a loop, the thread generating routine "fork" is called up at the head of the parallelized portion and the thread vanishing routine "join" is called up at a portion directly after the parallelized portion.

These routines "fork" and "join" are often called up on the outer side of the parallelized loop and what is more, toward a plurality of the parallelized loops, only one pair of them is called up. A region that is surrounded by the routines "fork"

and "join" and is larger than the real parallelized loops is referred to as a SPMD region. The processing of creating the SPMD region has been explained in Chau-Wen Tseng. "Compiler Optimizations for Eliminating Barrier Synchronization", PPOPP, 95, pp. 144–155, 1995. Furthermore, the processing by the code generating unit 109 is also the same as that in the first embodiment.

FIG. 29 is a diagram for illustrating the parallelized program 2720 obtained as the result of the above-described processing. In statements 2903, 2940 as well, the barrier synchronizations are called up instead of redistribution routines that are called up in statements 2102, 2140 in the parallelized program in the first embodiment in FIG. 21. Also, a routine "fork" is called up in a statement 2901 and a routine "join" is called up in a statement 2983. A portion surrounded by these routines "fork" and "join" is the SPMD region. A portion other than the SPMD region is the same as that in the program in FIG. 21.

(3) Modifications

In the first and the second embodiments, the data rearrangement has been performed in the respective compilers. The data rearranging method in the case can also be applied to the case where the array distribution processing is performed in programs such as a program that the user describes and a library for numerical computation.

Although the compilers provided in the first and the second embodiments create the parallelized programs for the multi processor system, the compilers themselves can be executed on any type of computer system.

What is claimed is:

1. A data rearranging method for a program including statements instructing redistribution of an array in a multi processor system including a plurality of processors each of which has an independent memory, comprising the steps of:

collecting data distribution formats that indicate schemes of allocating the respective array elements to said memories at the respective points in a program, subdividing the array into a set of subarrays, each of said subarrays belonging to only one processor in any one of said data distribution formats obtained at said format collecting step, and increasing dimension number of said original array and rearranging sequence of array elements so that said array elements in said each subarray possess consecutive addresses, wherein the array-subdividing step further includes the steps of:

analyzing the data distribution format;

if the format indicates "block(M)" and "*", setting a logical processor number corresponding to a number to be block-distributed in a subdivision PE number; and if the format indicates "block(M)" and "block(N)", setting a least common multiple of logical processor numbers corresponding to respective numbers to be block-distributed in the subdivision PE number, wherein the sequence rearranging step includes the step of:

calculating the increased dimension of the array using the subdivision PE number.

2. A data rearranging method for a program including statements instructing redistribution of an array in a multi processor system including a plurality of processors each of which has an independent memory, comprising the steps of:

collecting data distribution formats that indicate schemes of allocating the respective array elements to said memories at the respective points in a program, subdividing the array into a set of subarrays, each of said subarrays belonging to only one processor in any one of said data distribution formats obtained at said format collecting step, and increasing dimension number of said original array and rearranging sequence of array elements so that said array elements in said each subarray possess consecutive addresses, further including the steps of:

determining a number of types of the data distribution of the array from the collected data distribution formats; and proceeding with the array-subdividing step when the number is at least two.

* * * * *

UNITED STATES PATENT AND TRADEMARK OFFICE
CERTIFICATE OF CORRECTION

PATENT NO.     : 6,681,388 B1
DATED          : January 20, 2004
INVENTOR(S)    : Sato et al.

It is certified that error appears in the above-identified patent and that said Letters Patent is hereby corrected as shown below:

Title page,
Item [73], Assignee, please correct to read as follows:
-- Hitachi, Ltd., Tokyo (JP) --

Signed and Sealed this

Seventh Day of September, 2004

JON W. DUDAS
*Director of the United States Patent and Trademark Office*